United States Patent
Zhu et al.

(10) Patent No.: US 11,690,002 B2
(45) Date of Patent: Jun. 27, 2023

(54) COMMUNICATION METHOD AND COMMUNICATIONS APPARATUS

(71) Applicant: Huawei Technologies Co., Ltd., Shenzhen (CN)

(72) Inventors: Fangyuan Zhu, Beijing (CN); Yan Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/165,374

(22) Filed: Feb. 2, 2021

(65) Prior Publication Data
US 2021/0160770 A1 May 27, 2021

Related U.S. Application Data

(63) Continuation of application No. PCT/CN2020/075681, filed on Feb. 18, 2020.

(30) Foreign Application Priority Data

Feb. 18, 2019 (CN) .......................... 201910123356.7
Mar. 28, 2019 (CN) .......................... 201910244735.1

(51) Int. Cl.
*H04W 48/18* (2009.01)
*H04W 8/12* (2009.01)
(Continued)

(52) U.S. Cl.
CPC ............. *H04W 48/18* (2013.01); *H04W 8/12* (2013.01); *H04W 84/042* (2013.01); *H04W 84/12* (2013.01)

(58) Field of Classification Search
CPC ....... H04W 48/18; H04W 8/12; H04W 84/12; H04W 84/042; H04W 36/0016;
(Continued)

(56) References Cited

U.S. PATENT DOCUMENTS

| 2017/0303259 | A1 | 10/2017 | Lee et al. |
| 2018/0324645 | A1 | 11/2018 | Park et al. |

(Continued)

FOREIGN PATENT DOCUMENTS

| CN | 106982458 A | 7/2017 |
| CN | 108323245 A | 7/2018 |

(Continued)

OTHER PUBLICATIONS

3GPP TS 23.501 V15.2.0 "3rd Generation Partnership Project; Technical Specification Group Services and System Aspects; System Architecture for the 5G System; Stage 2(Release 15)," 3GPP TS 23.501 V15.2.0, Jun. 2018, 217 pages.

(Continued)

*Primary Examiner* — Wayne H Cai
(74) *Attorney, Agent, or Firm* — Conley Rose, P.C.

(57) ABSTRACT

A communication method includes sending, by a source mobility management network element in a first area, a first slice set for a home public land mobile network (PLMN) (HPLMN) of a terminal device to a target mobility management network element in a second area when handing over the terminal device from a source access network device in the first area to a target access network device in the second area, where the first slice set corresponds to a second slice set for the first area, and obtaining, by the target mobility management network element, a third slice set for the second area based on the first slice set.

20 Claims, 12 Drawing Sheets

(51) Int. Cl.
*H04W 84/04* (2009.01)
*H04W 84/12* (2009.01)

(58) Field of Classification Search
CPC ......... H04W 36/0022; H04W 36/0033; H04W 36/083; H04W 36/0835
See application file for complete search history.

(56) References Cited

U.S. PATENT DOCUMENTS

| | | | |
|---|---|---|---|
| 2019/0029065 A1* | 1/2019 | Park | H04W 48/02 |
| 2019/0053148 A1 | 2/2019 | Lee et al. | |
| 2019/0174405 A1 | 6/2019 | Yang et al. | |
| 2020/0053617 A1* | 2/2020 | Park | H04W 48/18 |
| 2020/0145538 A1* | 5/2020 | Qiao | H04M 15/8038 |
| 2020/0322857 A1* | 10/2020 | Park | H04W 76/34 |
| 2021/0168705 A1* | 6/2021 | Fiorese | H04W 12/037 |
| 2022/0167264 A1* | 5/2022 | Hedman | H04W 36/125 |

FOREIGN PATENT DOCUMENTS

| | | |
|---|---|---|
| CN | 108684073 A | 10/2018 |
| CN | 109219111 A | 1/2019 |
| RU | 2628316 C2 | 8/2017 |
| WO | 2018234085 A1 | 12/2018 |
| WO | 2018236819 A1 | 12/2018 |

OTHER PUBLICATIONS

Huawei, et al., "OI#4h: TS 23.501: Selection of a Target AMF supporting the Network Slices due to UE mobility," SA WG2 Meeting #124, Reno, Nevada, USA, S2-179523, Nov. 27-Dec. 1, 2017, 4 pages.

3GPP TS 23.501 V15.4.0, "3rd Generation Partnership Project; Technical Specification Group Services and System Aspects; System Architecture for the 5G System; Stage 2 (Release 15);" Dec. 2018, 236 pages.

3GPP TS 23.502 V15.4.1, "3rd Generation Partnership Project; Technical Specification Group Services and System Aspects; Procedures for the 5G System; Stage 2 (Release 15)," Jan. 2019, 347 pages.

Qualcomm Incorporated, et al., "TS 23.501: Applicability of UE slicing configuration in roaming scenarios," SA WG2 Meeting #S2-123, S2-178030, Oct. 23-27, 2017, Ljubljana, Slovenia, 11 pages.

Huawei, et al., "Evaluation to solutions of KI#2," 3GPP TSG-SA2 Meeting #129, S2-1810491, Dongguan, P.R.China, Oct. 15-19, 2018, 14 pages.

Ericsson "Slice and AMF selection at HO procedure," 3GPP Draft; S2-180111, Jan. 16, 2018, XP051389569, 23 pages.

Huawei, et al., "S-NSSAIs of UE Context transfer during inter PLMN mobility," 3GPP TSG-SA WG2 Meeting #131, Santa Cruz, Spain, Feb. 25-Mar. 1, 2019, S2-1901835, 7 pages.

* cited by examiner

COMMUNICATION METHOD AND COMMUNICATIONS APPARATUS

CROSS-REFERENCE TO RELATED APPLICATIONS

This application is a continuation of International Patent Application No. PCT/CN2020/075681 filed on Feb. 18, 2020, which claims priority to Chinese Patent Application No. 201910244735.1 filed on Mar. 28, 2019 and claims priority to Chinese Patent Application No. 201910123356.7 filed on Feb. 18, 2019. The disclosures of the aforementioned applications are hereby incorporated by reference in their entireties.

TECHNICAL FIELD

This application relates to the field of mobile communications technologies, and in particular, to a communication method and a communications apparatus.

BACKGROUND

Due to a reason such as movement of a terminal device, an access network device accessed by the terminal device hands over (to be specific, the terminal device is handed over from a source access network device to a target access network device). Further, a mobility management network element that provides an access service for the terminal device may also hand over (to be specific, the terminal device is handed over from a source mobility management network element to a target mobility management network element).

A slice identifier included in a set of slices that are allowed to be accessed, in a first area, by the terminal device and a slice identifier included in a set of slices that are allowed to be accessed, in a second area, by the terminal device may have different values. Based on this premise, there is no corresponding solution for how to select an appropriate target mobility management network element for the terminal device.

SUMMARY

This application provides a communication method and a communications apparatus, to select an appropriate target mobility management network element for a terminal device.

According to a first aspect, this application provides a communication method, including, when a terminal device is handed over from a source access network device in a first area to a target access network device in a second area, obtaining, by a source mobility management network element in the first area, information about a target mobility management network element in the second area based on a slice set for the first area, and sending, by the source mobility management network element, a slice set for a home public land mobile network (PLMN) (HPLMN) of the terminal device to the target mobility management network element, where the slice set for the HPLMN is corresponding to the slice set for the first area, and the slice set for the HPLMN is used to determine a slice set for the second area. Based on this solution, the target mobility management network element selected for the terminal device is determined based on the slice set for the HPLMN, and the slice set for the HPLMN is corresponding to the slice set for the first area such that the selected target mobility management network element can serve, in the second area, the slice set for the HPLMN, thereby selecting an appropriate target mobility management network element, and helping implement normal communication of the terminal device.

First case: The first area is a source PLMN, and the second area is a target PLMN.

In a possible implementation, the source mobility management network element determines, based on a mapping between a slice set for the source PLMN and a slice set for the HPLMN, the slice set that is for the HPLMN and that corresponds to the slice set for the source PLMN.

In a possible implementation, obtaining, by a source mobility management network element, information about a target mobility management network element in the second area based on a slice set for the first area includes sending, by the source mobility management network element, the slice set for the HPLMN and information about the target PLMN to a first device, and receiving, by the source mobility management network element from the first device, the information about the target mobility management network element, where the first device is a source slice selection network element or a source network repository network element in the source PLMN.

In a possible implementation, obtaining, by a source mobility management network element, information about a target mobility management network element in the second area based on a slice set for the first area includes sending, by the source mobility management network element, the slice set for the HPLMN to a source slice selection network element in the source PLMN, receiving, by the source mobility management network element from the source slice selection network element, the slice set for the target PLMN, sending, by the source mobility management network element, the slice set for the target PLMN and information about the target PLMN to a source network repository network element in the source PLMN, and receiving, by the source mobility management network element from the source network repository network element, the information about the target mobility management network element.

In a possible implementation, the source mobility management network element sends the slice set for the source PLMN to a source slice selection network element in the source PLMN, and the source mobility management network element receives, from the source slice selection network element, the slice set for the HPLMN.

In a possible implementation, obtaining, by a source mobility management network element, information about a target mobility management network element in the second area based on a slice set for the first area includes sending, by the source mobility management network element, information about the target PLMN to a source slice selection network element in the source PLMN, and receiving, by the source mobility management network element from the source slice selection network element, the information about the target mobility management network element.

In a possible implementation, obtaining, by a source mobility management network element, information about a target mobility management network element in the second area based on a slice set for the first area includes receiving, by the source mobility management network element from a source slice selection network element in the source PLMN, the slice set for the target PLMN, sending, by the source mobility management network element, the slice set for the target PLMN and information about the target PLMN to a source network repository network element in the source PLMN, and receiving, by the source mobility management network element from the source network repository network element, the information about the target mobility management network element.

Second case: The first area and the second area are in a same PLMN.

In a possible implementation, the source mobility management network element determines, based on a mapping between a slice set for the first area and a slice set for the HPLMN, the slice set that is for the HPLMN and that corresponds to the slice set for the first area.

In a possible implementation, obtaining, by a source mobility management network element, information about a target mobility management network element in the second area based on a slice set for the first area includes sending, by the source mobility management network element, the slice set for the HPLMN and information about the second area to a slice selection network element, and receiving, by the source mobility management network element from the slice selection network element, the information about the target mobility management network element, where the information about the target mobility management network element is determined based on the slice set for the HPLMN and the information about the second area.

In a possible implementation, the source mobility management network element sends the slice set for the first area to a slice selection network element, and the source mobility management network element receives, from the slice selection network element, the slice set that is for the HPLMN and that corresponds to the slice set for the first area.

In a possible implementation, obtaining, by a source mobility management network element, information about a target mobility management network element in the second area based on a slice set for the first area includes sending, by the source mobility management network element, the slice set for the first area and information about the second area to a slice selection network element, and receiving, by the source mobility management network element from the slice selection network element, the information about the target mobility management network element, where the information about the target mobility management network element is determined based on the slice set for the first area and the information about the second area.

According to a second aspect, this application provides a communication method, including, when a terminal device is handed over from a source access network device in a source PLMN to a target access network device in a target PLMN, obtaining, by a first device in the source PLMN, a slice set that is for an HPLMN of the terminal device and that corresponds to a slice set for the source PLMN, sending, by the first device, the slice set for the HPLMN to a second device in the target PLMN, where the slice set for the HPLMN is used to determine a target mobility management network element in the target PLMN, receiving, by the first device from the second device, information about the target mobility management network element, and sending, by the first device, the information about the target mobility management network element to a source mobility management network element in the source PLMN. Based on this solution, the target mobility management network element selected for the terminal device is determined based on the slice set for the HPLMN, and the slice set for the HPLMN is corresponding to the slice set for the source PLMN such that the selected target mobility management network element can serve, in the target PLMN, the slice set for the HPLMN, thereby selecting an appropriate target mobility management network element, and helping implement normal communication of the terminal device.

In a possible implementation, obtaining, by a first device in the source PLMN, a slice set that is for an HPLMN and that corresponds to a slice set for the source PLMN includes receiving, by the first device from the source mobility management network element, the slice set for the source PLMN, and determining the slice set that is for the HPLMN and that corresponds to the slice set for the source PLMN, or receiving, by the first device from the source mobility management network element, the slice set for the HPLMN.

In a possible implementation, the first device is a source slice selection network element in the source PLMN, and the second device is a target slice selection network element in the target PLMN, or the first device is a source network repository network element in the source PLMN, and the second device is a target network repository network element in the target PLMN.

In a possible implementation, the first device receives, from the source mobility management network element, information about the target PLMN, and the first device selects the second device based on the information about the target PLMN.

According to a third aspect, this application provides a communication method, including, when a terminal device is handed over from a source access network device in a source PLMN to a target access network device in a target PLMN, obtaining, by a source slice selection network element in the source PLMN, a slice set that is for an HPLMN of the terminal device and that corresponds to a slice set for the source PLMN, sending, by the source slice selection network element, the slice set for the HPLMN to a target slice selection network element in the target PLMN, where the slice set for the HPLMN is used to determine a slice set for the target PLMN, receiving, by the source slice selection network element from the target slice selection network element, the slice set for the target PLMN, and sending, by the source slice selection network element, the slice set for the target PLMN to a source mobility management network element. Based on this solution, a target mobility management network element selected for the terminal device is determined based on the slice set for the target PLMN, the slice set for the target PLMN is corresponding to the slice set for the HPLMN, and the slice set for the HPLMN is corresponding to the slice set of the source PLMN such that the selected target mobility management network element can serve, in the target PLMN, the slice set for the HPLMN, thereby selecting an appropriate target mobility management network element, and helping implement normal communication of the terminal device.

In a possible implementation, obtaining, by a source slice selection network element in the source PLMN, a slice set that is for an HPLMN of the terminal device and that corresponds to a slice set for the source PLMN includes receiving, by the source slice selection network element from the source mobility management network element, the slice set for the source PLMN, and determining the slice set that is for the HPLMN and that corresponds to the slice set for the source PLMN, or receiving, by the source slice selection network element from the source mobility management network element, the slice set for the HPLMN.

In a possible implementation, the source slice selection network element receives, from the source mobility management network element, information about the target PLMN, and the source slice selection network element selects the target slice selection network element based on the information about the target PLMN.

According to a fourth aspect, this application provides a communication method, including, when a terminal device is handed over from a source access network device in a first area to a target access network device in a second area, obtaining, by a slice selection network element, a slice set that is for an HPLMN of the terminal device and that corresponds to a slice set for the first area and information about the second area, determining, by the slice selection network element, a slice set for the second area based on the slice set for the HPLMN and the information about the second area, determining, by the slice selection network element, information about a target mobility management network element based on the slice set for the second area, and sending, by the slice selection network element, the information about the target mobility management network element to a source mobility management network element. Based on this solution, the target mobility management network element selected for the terminal device is determined based on the slice set for the HPLMN, and the slice set for the HPLMN is corresponding to the slice set for the first area such that the selected target mobility management network element can serve, in the second area, the slice set for the HPLMN, thereby selecting an appropriate target mobility management network element, and helping implement normal communication of the terminal device.

In a possible implementation, obtaining, by a slice selection network element, a slice set that is for an HPLMN of the terminal device and that corresponds to a slice set for the first area includes receiving, by the slice selection network element from the source mobility management network element in the first area, the slice set for the first area, and determining the slice set that is for the HPLMN and that corresponds to the slice set for the first area, or receiving, by the slice selection network element from the source mobility management network element, the slice set for the HPLMN.

In a possible implementation, the slice selection network element stores a mapping between a slice set for the first area and a slice set for the HPLMN, and a mapping between a slice set for the second area and a slice set for the HPLMN.

According to a fifth aspect, this application provides a communication method, including, when a terminal device is handed over from a source access network device in a source PLMN to a target access network device in a target PLMN, receiving, by a source network repository network element in the source PLMN from a source mobility management network element in the source PLMN, a slice set for the target PLMN, sending, by the source network repository network element, the slice set for the target PLMN to a target network repository network element in the target PLMN, receiving, by the source network repository network element from the target network repository network element, information about a target mobility management network element, and sending, by the source network repository network element, the information about the target mobility management network element to the source mobility management network element.

In a possible implementation, the source network repository network element receives, from the source mobility management network element, information about the target PLMN, and the source network repository network element determines the target network repository network element based on the information about the target PLMN.

According to a sixth aspect, this application provides a communication method, including, when a terminal device is handed over from a source access network device in a source PLMN to a target access network device in a target PLMN, receiving, by a target slice selection network element in the target PLMN from a source slice selection network element in the source PLMN, a slice set for an HPLMN of the terminal device, determining, by the target slice selection network element, information about a target mobility management network element that supports a slice set for the target PLMN, where the slice set for the target PLMN corresponds to the slice set for the HPLMN, and sending, by the target slice selection network element, the information about the target mobility management network element to the source slice selection network element. Based on this solution, the target mobility management network element selected for the terminal device is determined based on the slice set for the target PLMN, the slice set for the target PLMN is corresponding to the slice set for the HPLMN, and the slice set for the HPLMN is corresponding to a slice set for the source PLMN such that the selected target mobility management network element can serve, in the target PLMN, the slice set for the HPLMN, thereby selecting an appropriate target mobility management network element, and helping implement normal communication of the terminal device.

In a possible implementation, the target slice selection network element determines the slice set for the target PLMN based on a mapping between a slice set for the HPLMN and a slice set for the target PLMN.

According to a seventh aspect, this application provides a communication method, including, when a terminal device is handed over from a source access network device in a source PLMN to a target access network device in a target PLMN, receiving, by a target slice selection network element in the target PLMN from a source slice selection network element in the source PLMN or from a target network repository network element in the target PLMN, a slice set for an HPLMN of a terminal device, and sending, by the target slice selection network element to the source slice selection network element or the target network repository network element, a slice set for the target PLMN that corresponds to the slice set for the HPLMN, where the slice set for the target PLMN is used to determine information about a target mobility management network element in the target PLMN. Based on this solution, a target mobility management network element selected for the terminal device is determined based on the slice set for the target PLMN, the slice set for the target PLMN is corresponding to the slice set for the HPLMN, and the slice set for the HPLMN is corresponding to the slice set for the source PLMN such that the selected target mobility management network element can serve, in the target PLMN, the slice set for the HPLMN, thereby selecting an appropriate target mobility management network element, and helping implement normal communication of the terminal device.

In a possible implementation, the target slice selection network element determines the slice set for the target PLMN based on a mapping between a slice set for the HPLMN and a slice set for the target PLMN.

According to an eighth aspect, this application provides a communication method, including, when a terminal device is handed over from a source access network device in a source PLMN to a target access network device in a target PLMN, receiving, by a target network repository network element in the target PLMN from a target slice selection network element in the target PLMN or a source network repository network element in the source PLMN, a slice set that is for the target PLMN and that corresponds to a slice set for an HPLMN of the terminal device, determining, by the target network repository network element, information about a target mobility management network element that supports the slice set for the target PLMN, and sending, by the target network repository network element, the information about the target mobility management network element to the source network repository network element. Based on this solution, the target mobility management network element selected for the terminal device is determined based on the slice set for the target PLMN, the slice set for the target PLMN is corresponding to the slice set for the HPLMN, and the slice set for the HPLMN is corresponding to a slice set for the source PLMN such that the selected target mobility management network element can serve, in the target PLMN, the slice set for the HPLMN, thereby selecting an appropriate target mobility management network element, and helping implement normal communication of the terminal device.

According to a ninth aspect, this application provides a communications apparatus. The apparatus has a function of implementing the communication method according to any one of the foregoing aspects or the implementations of the foregoing aspects. The function may be implemented by hardware, or may be implemented by hardware executing corresponding software. The hardware or the software includes one or more modules corresponding to the foregoing function.

According to a tenth aspect, this application provides a communications apparatus, including a processor and a memory. The memory is configured to store a computer-executable instruction. When the apparatus runs, the processor executes the computer-executable instruction stored in the memory such that the apparatus performs the communication method according to any one of the foregoing aspects or the implementations of the foregoing aspects.

According to an eleventh aspect, this application provides a communications apparatus, including units or means for performing the steps according to any one of the foregoing aspects.

According to a twelfth aspect, this application provides a communications apparatus, including a processor and an interface circuit. The processor is configured to communicate with another apparatus through the interface circuit, and perform the method according to any one of the foregoing aspects. There are one or more processors.

According to a thirteenth aspect, this application provides a communications apparatus, including a processor configured to connect to a memory, and invoke a program stored in the memory, to perform the method according to any one of the foregoing aspects or the implementation of any one of the foregoing aspects. The memory may be located in the apparatus, or may be located outside the apparatus. In addition, there are one or more processors.

According to a fourteenth aspect, this application further provides a computer-readable storage medium, and the computer-readable storage medium stores an instruction. When the instruction is run on a computer, the computer is enabled to perform the method according to any one of the foregoing aspects.

According to a fifteenth aspect, this application further provides a computer program product including an instruction. When the computer program product runs on a computer, the computer is enabled to perform the method according to any one of the foregoing aspects.

According to a sixteenth aspect, this application further provides a chip system, including a processor configured to perform the method according to any one of the foregoing aspects.

According to a seventeenth aspect, this application further provides a communication method, including, when a terminal device is handed over from a source access network device in a first area to a target access network device in a second area, receiving, by a target mobility management network element in the second area from a source mobility management network element in the first area, a slice set for an HPLMN of the terminal device, where the slice set for the HPLMN is corresponding to a slice set for the first area, and obtaining, by the target mobility management network element, a slice set for the second area based on the slice set for the HPLMN.

In a possible implementation, obtaining, by the target mobility management network element, a slice set for the second area based on the slice set for the HPLMN includes determining, by the target mobility management network element, the slice set for the second area based on configuration information.

In a possible implementation, the configuration information includes a mapping between a slice set for the second area and a slice set for the HPLMN, or the configuration information includes a roaming agreement between the second area and the HPLMN, and the roaming agreement is used to determine a mapping between a slice set for the second area and a slice set for the HPLMN.

In a possible implementation, obtaining, by the target mobility management network element, a slice set for the second area based on the slice set for the HPLMN includes sending, by the target mobility management network element, first information to a target slice selection network element in the second area, where the first information includes the slice set for the HPLMN, and receiving, by the target mobility management network element from the target slice selection network element, the slice set for the second area.

In a possible implementation, the first information further includes indication information, and the indication information is used to indicate the target network slice selection function (NSSF) to generate a slice set for a target PLMN.

In a possible implementation, the target mobility management network element receives, from the target slice selection network element, the mapping between a slice set for the HPLMN and a slice set for the second area.

In a possible implementation, the first area is a source PLMN, and the second area is the target PLMN.

According to an eighteenth aspect, this application further provides a communication method, including, when a terminal device is handed over from a source access network device in a first area to a target access network device in a second area, sending, by a source mobility management network element in the first area, a request message to a target network repository function network element in the second area, receiving, by a source mobility management network element from the target network repository function network element, an identifier of a target mobility management network element in the second area, and sending, by the source mobility management network element, a slice set for an HPLMN of the terminal device to the target mobility management network element, where the slice set for the HPLMN is corresponding to a slice set for the first area, and the slice set for the HPLMN is used to determine a slice set for the second area.

In a possible implementation, the first area is a source PLMN, and the second area is a target PLMN.

According to a nineteenth aspect, this application further provides a communication method, including configuring, by a target network repository function network element in a second area, an identifier of a target mobility management network element in the second area, when a terminal device is handed over from a source access network device in a first area to a target access network device in the second area, receiving, by the target network repository function network element, a request message from a source mobility management network element in the first area, and sending, by the target network repository function network element, the identifier of the target mobility management network element to the source mobility management network element.

In a possible implementation, the first area is a source PLMN, and the second area is a target PLMN.

According to a twentieth aspect, this application further provides a communications apparatus. The apparatus has a function of implementing the communication method according to any one of the seventeenth aspect to the nineteenth aspect or the implementations of the seventeenth aspect to the nineteenth aspect. The function may be implemented by hardware, or may be implemented by hardware executing corresponding software. The hardware or the software includes one or more modules corresponding to the foregoing function.

According to a twenty-first aspect, this application further provides a communications apparatus, including a processor and a memory. The memory is configured to store a computer-executable instruction. When the apparatus runs, the processor executes the computer-executable instruction stored in the memory such that the apparatus performs the communication method according to any one of the seventeenth aspect to the nineteenth aspect or the implementations of the seventeenth aspect to the nineteenth aspect.

According to a twenty-second aspect, this application further provides a communications apparatus, including units or means for performing the steps according to any one of the seventeenth aspect to the nineteenth aspect.

According to a twenty-third aspect, this application further provides a communications apparatus, including a processor and an interface circuit. The processor is configured to communicate with another apparatus through the interface circuit, and perform any method according to any one of the seventeenth aspect to the nineteenth aspect. There are one or more processors.

According to a twenty-fourth aspect, this application further provides a communications apparatus, including a processor configured to connect to a memory, and invoke a program stored in the memory, to perform the method according to any one of seventeenth aspect to the nineteenth aspect or implementations of the seventeenth aspect to the nineteenth aspect. The memory may be located in the apparatus, or may be located outside the apparatus. In addition, there are one or more processors.

According to a twenty-fifth aspect, this application further provides a computer-readable storage medium, and the computer-readable storage medium stores an instruction. When the instruction is run on a computer, the computer is enabled to perform the method according to any one of the seventeenth aspect to the nineteenth aspect.

According to a twenty-sixth aspect, this application further provides a computer program product including an instruction. When the computer program product runs on a computer, the computer is enabled to perform the method according to any one of the seventeenth aspect to the nineteenth aspect.

According to a twenty-seventh aspect, this application further provides a chip system, including a processor configured to perform the method according to any one of the seventeenth aspect to the nineteenth aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality" means two or more than two.

Figure 1:
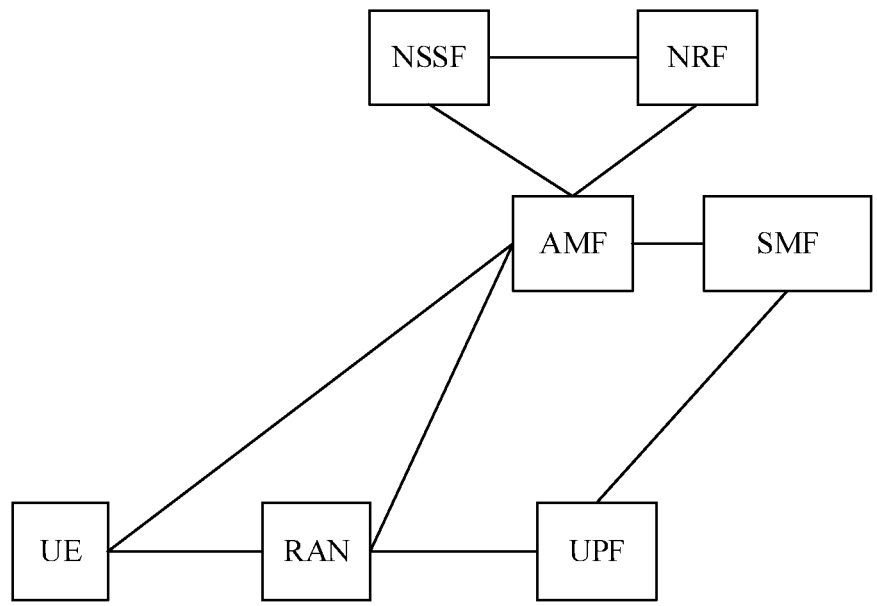
FIG. 1 is a schematic diagram of a possible network architecture to which this application is applicable.

FIG. 1 is a schematic diagram of a 5th generation (5G) network architecture. The figure shows some network elements in the 5G architecture. A user plane function (UPF) network element includes user plane-related functions such as data packet routing and transmission, packet detection, service usage reporting, quality of service (QoS) processing, lawful interception, uplink data packet detection, and downlink data packet storage.

An access and mobility management function (AMF) network element is responsible for user mobility management, including mobility status management, temporary user identity allocation, and user authentication and authorization.

A session management function (SMF) network element includes session-related functions such as session management (for example, session establishment, modification, and release, including tunnel maintenance between the UPF and an access network (AN)), UPF network element selection and control, service and session continuity (SSC) mode selection, and roaming.

An NSSF network element is responsible for determining a network slice instance, selecting an AMF network element, and so on.

A network repository function (NRF) network element is responsible for network element registration function and discovery function, and maintaining information about the network element, for example, an instance identifier, a type, a PLMN, a slice-related identifier, an Internet Protocol (IP) address, a capability, and a supported service of the network element.

A mobility management network element in this application may be the AMF network element shown in FIG. 1, or may be a network element having a function of the AMF network element in a future communications system. A user plane network element in this application may be the UPF network element shown in FIG. 1, or may be a network element having a function of the UPF network element in a future communications system. A session management network element in this application may be the SMF network element shown in FIG. 1, or may be a network element having a function of the SMF network element in a future communications system. A slice selection network element in this application may be the NSSF network element shown in FIG. 1, or may be a network element that has a function of the NSSF network element in a future communications system. A network repository network element in this application may be the NRF network element shown in FIG. 1, or may be a network element that has a function of the NRF network element in a future communications system.

An access network device (or a radio access network (RAN) device) in this application is a device that provides a wireless communication function for a terminal. The access network device includes but is not limited to a next generation NodeB (g nodeB or gNB), an evolved NodeB (eNB), a radio network controller (RNC), a NodeB (NB), a base station controller (BSC), a base transceiver station (BTS), a home NodeB (for example, a home evolved nodeB or a HNB), a baseband unit (BBU), a transmission reception point (TRP), a transmitting point (TP), a mobile switching center, and the like in 5G.

A terminal device (or a user equipment (UE)) in this application is a device having wireless transmission and reception functions, and may be deployed on land, where the deployment includes indoor or outdoor, or handheld or vehicle-mounted deployment, may be deployed on water (for example, on a ship), or may be deployed in air (for example, on an aircraft, a balloon, and a satellite). The terminal device may be a mobile phone, a tablet (e.g., IPAD), a computer having wireless transmission and reception functions, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

For ease of description, this application is subsequently described using an example in which the mobility management network element is the AMF network element, the slice selection network element is the NSSF network element, the session management network element is the SMF network element, the user plane network element is the UPF network element, and the network repository network element is the NRF network element. Further, the AMF network element is referred to as an AMF for short, the NSSF network element is referred to as an NSSF for short, the SMF network element is referred to as an SMF for short, the UPF network element is referred to as a UPF for short, the NRF network element is referred to as an NRF for short, the terminal device is referred to as UE for short, and the access network device is referred to as a RAN for short. To be specific, the AMF subsequently described in this application may be replaced with the mobility management network element, the NSSF may be replaced with the slice selection network element, the SMF may be replaced with the session management network element, the NRF may be replaced with the network repository network element, the UPF may be replaced with the user plane network element, the RAN may be replaced with the access network device, and the UE may be replaced with the terminal device.

It should be noted that, in this application, a "network slice" and a "slice" refer to same content, one of the terms is used for description in different places, and the two terms are interchangeable.

Currently, various scenarios have different requirements, for example, requirements on charging, policy, security, and mobility, on a 3rd Generation Partnership Project (3GPP) ecosystem. The 3GPP emphasizes that network slices do not affect each other. For example, a large quantity of burst meter reading services should not affect normal mobile broadband services. To meet diversified requirements and isolation between slices, independent operation, administration and maintenance between services are required, and customized service functions and analysis capabilities are provided. Instances of different service types are deployed on different network slices, and instances of a same service type may also be deployed on different network slices.

When a network slice is deployed in a core network, and a user initially attaches to (or registers with) the network, a network slice selection process is triggered. The slice selection process depends on subscription data of the user, local configuration information, a roaming agreement, an operator policy, and the like. In the network slice selection process, the foregoing parameters need to be comprehensively considered to select an optimal slice type for UE.

When the UE needs to access a network slice, the UE may provide the requested network slice to the core network, for the core network to select a network slice instance for the UE. The network slice requested by the UE may be indicated using requested network slice selection assistance information (NSSAI). The requested NSSAI includes one or more pieces of single NSSAI (single network slice selection assistance information, S-NSSAI). Each piece of S-NSSAI is used to identify a network slice type, and may alternatively be understood as that the S-NSSAI is used to identify a network slice, or may be understood as that the S-NSSAI is identification information of a network slice.

After the UE registers with the network, a core network element (such as an AMF or an NSSF) performs comprehensive determining based on information such as subscription data of the UE, the requested NSSAI of the UE, a roaming agreement, and a local configuration, and selects a set of network slices that are allowed to be accessed by the UE. The set of network slices that are allowed to be accessed may be represented using allowed NSSAI, and all S-NSSAI included in the allowed NSSAI is valid S-NSSAI for the current network. If the UE registers with a roaming network, and S-NSSAI included in allowed NSSAI for the current registered network is different from S-NSSAI that is in an HPLMN and that included in the subscription data of the UE, the core network element (such as the AMF or the NSSF) further returns a mapping to the UE, to indicate the mapping between the S-NSSAI included in the allowed NSSAI and the S-NSSAI for the HPLMN. When the UE needs to initiate a service request subsequently, the UE may select S-NSSAI from the allowed NSSAI to initiate a service.

This application is specific to a scenario in which due to a reason such as movement of the UE, a RAN accessed by UE needs to hand over, to be specific, the UE needs to be handed over from a source RAN to a target RAN, and when the source RAN cannot hand over to the target RAN through an Xn interface, the handover between the source RAN and the target RAN needs to be completed through an N2 interface (that is, an interface between the RAN and the AMF).

Figure 2:
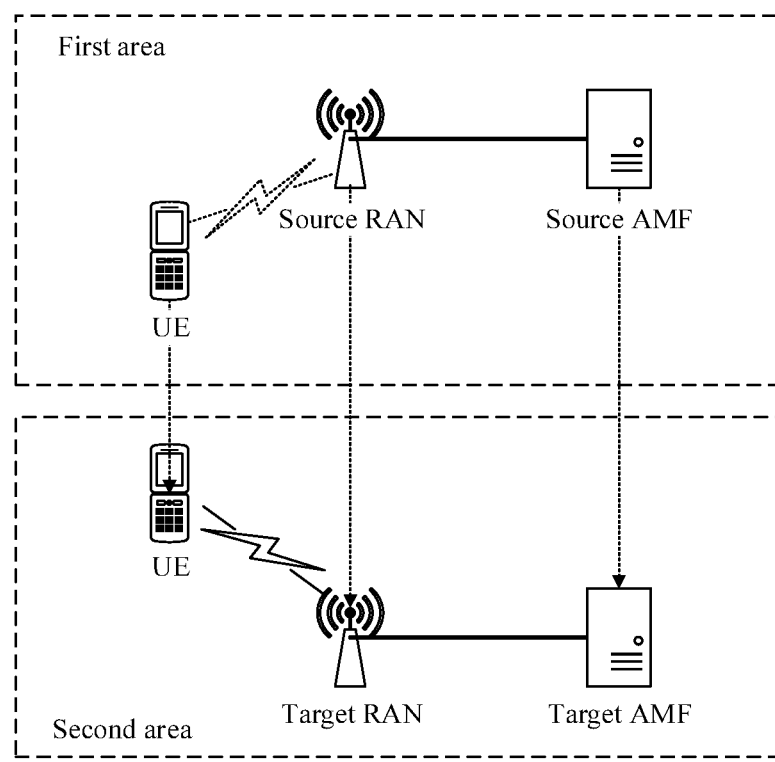
FIG. 2 is a schematic diagram of an application scenario to which this application is applicable.

FIG. 2 shows an application scenario to which this application is applicable. Before UE moves, the UE accesses a source RAN in a first area, and an AMF that provides an access service for the UE is a source AMF in the first area. After the UE moves, the UE accesses a target RAN in a second area, and an AMF that provides an access service for the UE is a target AMF in the second area.

The following describes the application scenario shown in FIG. 2 with reference to two specific scenarios.

Figure 3:
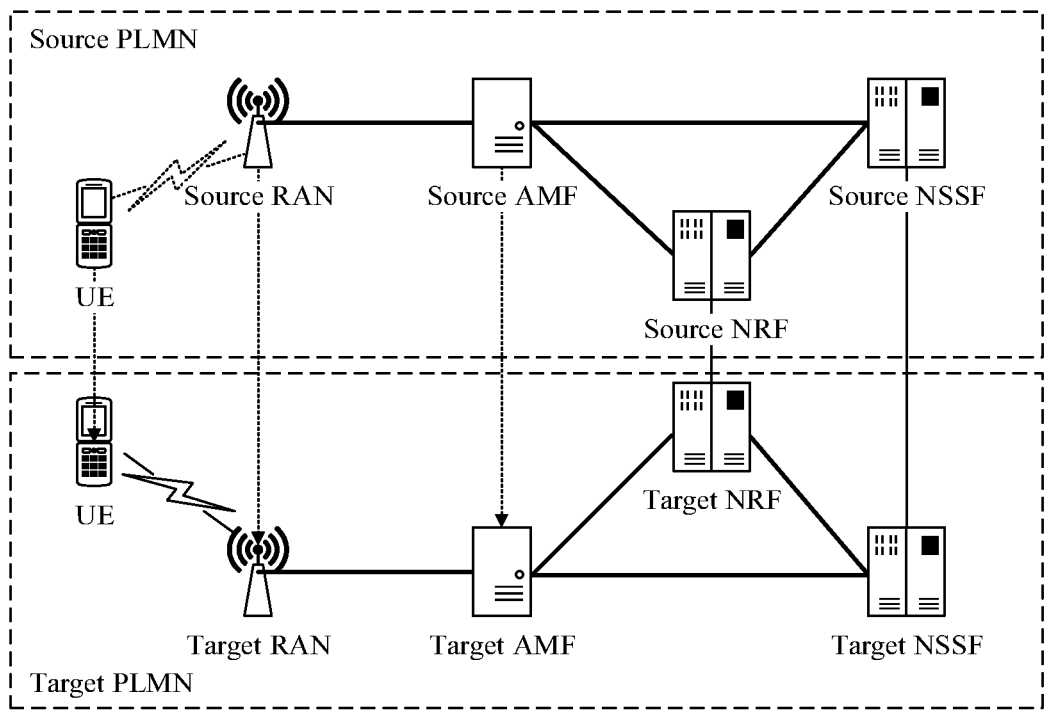
FIG. 3 is a schematic diagram of an application scenario to which this application is applicable.

FIG. 3 shows a first specific application scenario to which this application is applicable. Before the UE moves, the source RAN and the source AMF that serve the UE are in a source PLMN. After the UE moves, the target RAN and the target AMF that serve the UE are in a target PLMN. In addition, the source PLMN further includes a source NSSF and a source NRF, and the target PLMN further includes a target NSSF and a target NRF. That is, in FIG. 2, the first area refers to the source PLMN, and the second area refers to the target PLMN.

Based on this application scenario, in a first case, the source PLMN is a visited PLMN (VPLMN), and the target PLMN is also a VPLMN. In a second case, the source PLMN is a VPLMN, and the target PLMN is an HPLMN. In a third case, the source PLMN is an HPLMN, and the target PLMN is a VPLMN. In a fourth case, the source PLMN is an HPLMN, and the target PLMN is also an HPLMN. This application is for the first three cases. In addition, the source PLMN and the target PLMN are different PLMNs.

In this application, allowed NSSAI of the UE for the source PLMN is referred to as a slice set for the source PLMN, or referred to as valid NSSAI for the source PLMN. When the source PLMN is a VPLMN, there is a mapping between each piece of S-NSSAI for the slice set for the source PLMN and S-NSSAI for an HPLMN. Therefore, a slice set that is for the HPLMN and that corresponds to the slice set for the source PLMN may be determined based on the mapping. The slice set for the HPLMN may also be referred to as valid NSSAI for the HPLMN, or referred to as S-NSSAI that is in the HPLMN and that corresponds to the allowed NSSAI for the source PLMN. In different PLMNs, S-NSSAI values corresponding to the different PLMNs may be used to store the allowed NSSAI of the UE.

Table 1 shows an example of the mapping (which is referred to as mapping-1 in this application) between a slice set for the source PLMN and a slice set for the HPLMN.

TABLE 1

| Slice set for the source PLMN (Allowed NSSAI of the UE for the source PLMN) | Slice set for the HPLMN (S-NSSAI that is in the HPLMN and that corresponds to the allowed NSSAI for the source PLMN) |
| --- | --- |
| S-NSSAI-A | S-NSSAI-AA |
| S-NSSAI-B | S-NSSAI-BB |

In an implementation, the mapping may be stored in the UE, the source AMF, or the source NSSF, or may be simultaneously stored in a plurality of devices in the UE, the source AMF, and the source NSSF.

The mapping may be used to perform mapping conversion between the slice set of the UE in the source PLMN and the slice set of the UE in the HPLMN. The mapping may be determined according to a roaming agreement between the source PLMN and the HPLMN. Certainly, if the source PLMN is also an HPLMN, the mapping may not be required.

In this application, allowed NSSAI of the UE for the target PLMN is referred to as a slice set for the target PLMN, or referred to as valid NSSAI for the target PLMN. When the target PLMN is a VPLMN, there is a mapping between a slice set for the target PLMN and a slice set for an HPLMN.

Table 2 shows an example of the mapping (which is referred to as mapping-2 in this application) between a slice set for the target PLMN and a slice set for the HPLMN.

TABLE 2

| Slice set for the target PLMN (Allowed NSSAI of the UE for the target PLMN) | Slice set for the HPLMN (S-NSSAI that is in the HPLMN and that corresponds to the allowed NSSAI for the target PLMN) |
| --- | --- |
| S-NSSAI-C | S-NSSAI-AA |
| S-NSSAI-D | S-NSSAI-BB |

In an implementation, the mapping may be stored in the UE, the target AMF, or the target NSSF, or may be simultaneously stored in a plurality of devices in the UE, the target AMF, and the target NSSF.

The mapping may be used to perform mapping conversion between the slice set of the UE in the target PLMN and the slice set of the UE in the HPLMN. The mapping may be determined according to a roaming agreement between the target PLMN and the HPLMN. Certainly, if the target PLMN is also an HPLMN, the mapping may not be required.

Figure 4:
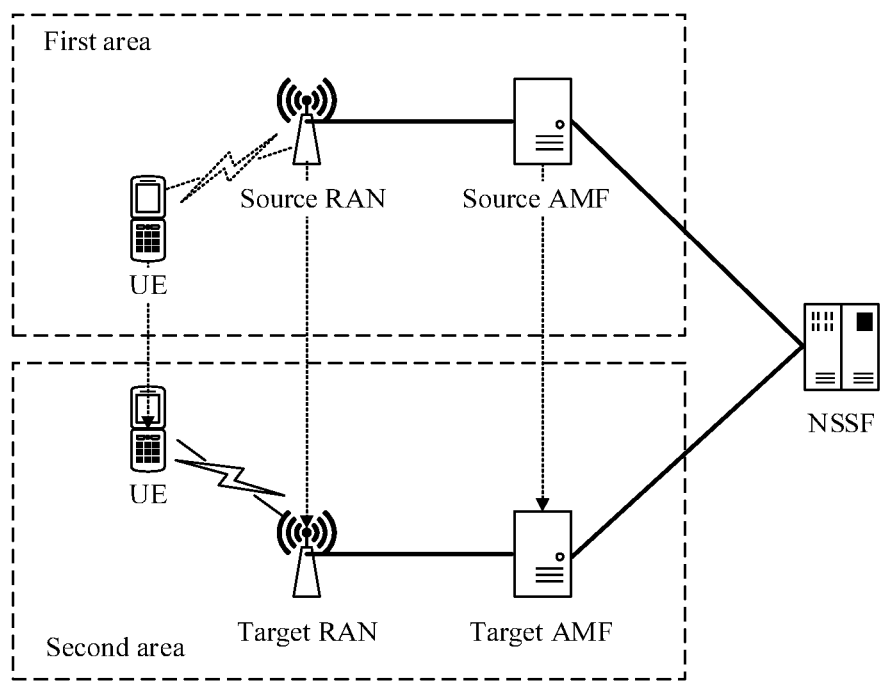
FIG. 4 is a schematic diagram of an application scenario to which this application is applicable.

FIG. 4 shows a second specific application scenario to which this application is applicable. Before the UE moves, the source RAN and the source AMF that serve the UE are in the first area (a physical area). After the UE moves, the target RAN and the target AMF that serve the UE are in the second area (a physical area). In addition, the first area and the second area are in a same PLMN, and the PLMN may be a VPLMN or an HPLMN.

For example, in an actual application, the scenario may be an enhancing topology of SMF and UPF in 5G networks (ETSUN) scenario. In the ETSUN scenario, the UE initiates a session establishment request that carries S-NSSAI (for example, a slice 1). A network selects an SMF and a UPF for a session. The SMF and the UPF are referred to as an anchor SMF and an anchor UPF. Subsequently, the UE moves to the first area and moves out of a service range of the anchor SMF, the network inserts an I-SMF 1 and an I-UPF 1, to ensure service continuity of the session. If the slice 1 is not deployed in the first area, the I-SMF 1 selected by the network is in a slice, for example, a slice A, different from a slice in which the anchor SMF is located. Subsequently, the UE continues to move from the first area to the second area, and the UE moves out of a service range of the I-SMF 1. In this case, the network needs to select a new I-SMF 2 and a new I-UPF 2 to serve the UE. If neither the slice 1 nor the slice A is not deployed in the second area, the I-SMF 2 selected by the network is in a slice, for example, a slice B, different from a slice in which the anchor SMF is located.

In addition, there is a mapping between a slice set of the UE in the first area (or allowed NSSAI of the UE in the first area) and a slice set of the UE in an HPLMN (or S-NSSAI that is in the HPLMN and that corresponds to the allowed NSSAI for the first area).

Table 3 shows an example of the mapping (or mapping-3 in this application) between a slice set for the first area and a slice set for the HPLMN.

TABLE 3

| Slice set for the first area (Allowed NSSAI of the UE in the first area) | Slice set for the HPLMN (S-NSSAI that is in the HPLMN and that corresponds to the allowed NSSAI for the first area) |
|---|---|
| S-NSSAI-A1 | S-NSSAI-AA1 |
| S-NSSAI-B1 | S-NSSAI-BB1 |

In an implementation, the mapping may be stored in the UE, the source AMF, or the NSSF, or may be simultaneously stored in a plurality of devices in the UE, the source AMF, and the NSSF.

There is a mapping between a slice set of the UE in the second area (or allowed NSSAI of the UE in the second area) and a slice set of the UE in the HPLMN (or S-NSSAI that is in the HPLMN and that corresponds to the allowed NSSAI for the second area).

Table 4 shows an example of the mapping (or mapping-4 in this application) between a slice set for the second area and a slice set for the HPLMN.

TABLE 4

| Slice set for the second area (Allowed NSSAI of the UE in the second area) | Slice set for the HPLMN (S-NSSAI that is in the HPLMN and that corresponds to the allowed NSSAI for the second area) |
|---|---|
| S-NSSAI-C1 | S-NSSAI-AA1 |
| S-NSSAI-D1 | S-NSSAI-BB1 |

In an implementation, the mapping may be stored in the UE, the target AMF, or the NSSF, or may be simultaneously stored in a plurality of devices in the UE, the target AMF, and the NSSF.

Based on the application scenario shown in FIG. 3 or FIG. 4, how to select an appropriate target AMF for the UE after the UE moves is a problem to be resolved in this application.

It should be noted that the following embodiments specific to FIG. 3 are described using an example in which both the source PLMN and the target PLMN are in a VPLMN.

Figure 5:
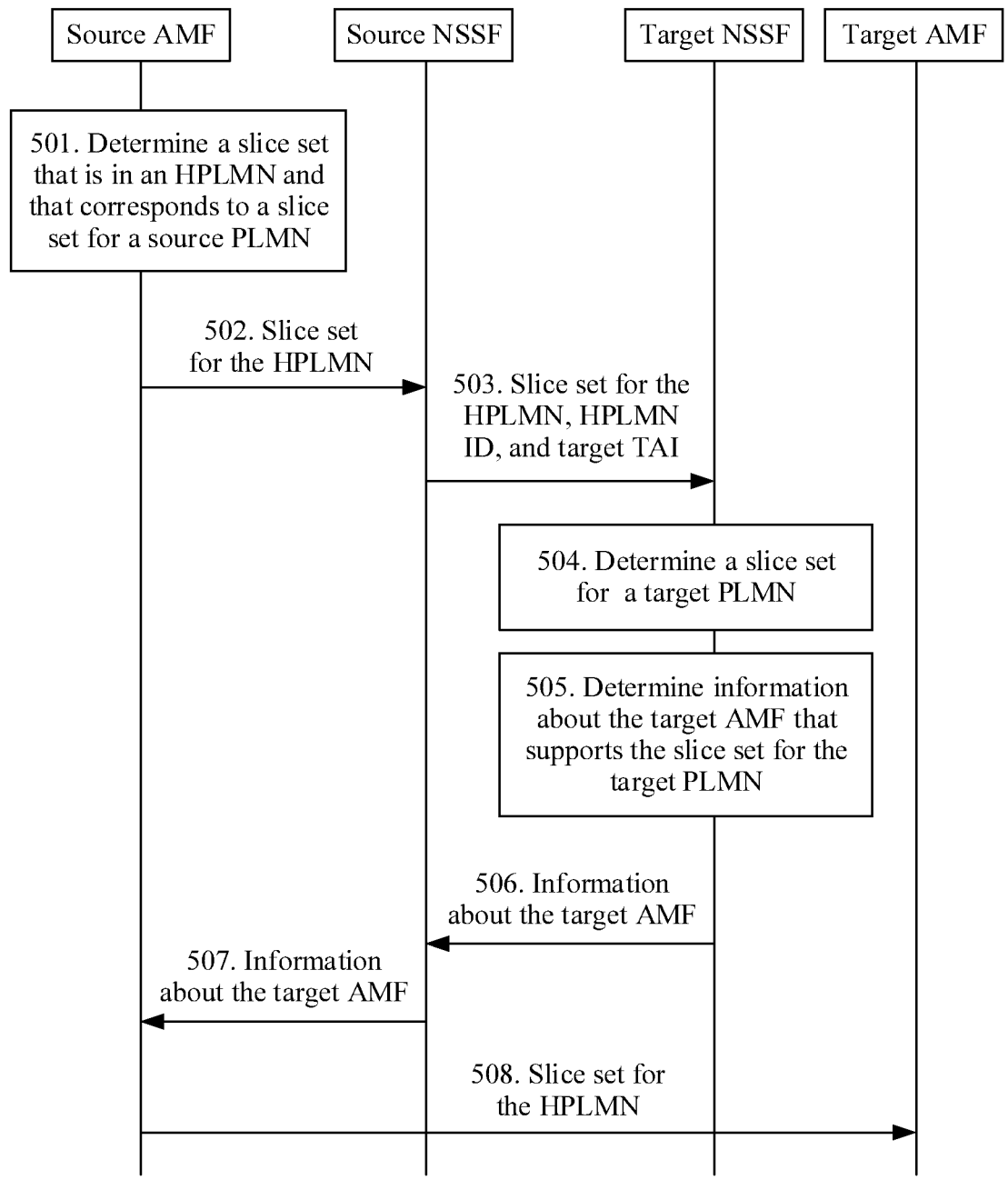
FIG. 5 is a schematic diagram of a communication method according to this application.

FIG. 5 is a schematic diagram of a first communication method according to this application. The method may be used for the scenario shown in FIG. 3 to select an appropriate target AMF for the UE. The method includes the following steps.

Step 501: When the UE is handed over from the source RAN to the target RAN, the source AMF determines, based on a slice set for the source PLMN, a slice set that is for an HPLMN and that corresponds to the slice set for the source PLMN.

For example, if the source AMF stores a mapping (as shown in Table 1) between a slice set for the source PLMN and a slice set for the HPLMN, the source AMF may determine, based on the mapping, the slice set that is for the HPLMN and that corresponds to the slice set for the source PLMN. For example, it is determined, based on Table 1, that the slice set that is for the HPLMN and that corresponds to the slice set (including the S-NSSAI-A and the S-NSSAI-B) in the source PLMN includes the S-NSSAI-AA and the S-NSSAI-BB.

Optionally, the mapping may be stored in a context of the UE.

In an implementation, before step 501, the source AMF receives a handover required message sent by the source RAN, where the message may carry a target identifier (target ID), the target identifier includes an identifier of the target RAN and a target tracking area identity (TAI) of the target RAN, and the target TAI further includes information about the target PLMN (for example, an ID of the target PLMN).

Optionally, before determining the slice set that is for the HPLMN and that corresponds to the slice set for the source PLMN, the source AMF determines that this handover is an inter-PLMN system handover, and therefore triggers execution of step 501.

For example, if the source AMF determines that the target PLMN included in the target TAI is different from the PLMN in which the source AMF is located, the source AMF may determine that this handover is an inter-PLMN system handover.

Step 502: The source AMF sends the slice set for the HPLMN to the source NSSF. Correspondingly, the source NSSF may receive the slice set for the HPLMN.

For example, the source AMF may initiate a request message to the source NSSF by invoking an Nnssf_NSSelection_Get service operation of the source NSSF, and the request message carries the slice set for the HPLMN.

By invoking the foregoing service operation, the source AMF may further send a home PLMN ID of the UE and the target TAI to the source NSSF. The home PLMN ID of the UE is an HPLMN ID.

Step 503: The source NSSF sends the slice set for the HPLMN, the HPLMN ID, and the target TAI to the target NSSF. Correspondingly, the target NSSF may receive the slice set for the HPLMN, the HPLMN ID, and the target TAI.

For example, the source NSSF initiates a request message to the target NSSF by invoking an Nnssf_NSSelection_Get service operation of the target NSSF, and the request message carries the slice set for the HPLMN, the HPLMN ID, and the target TAI. The HPLMN ID is used to indicate that the slice set is a slice set for the HPLMN.

For example, the source NSSF determines the information about the target PLMN based on the received target TAI, and then determines (or selects) the target NSSF based on the information about the target PLMN, to send the slice set for the HPLMN to the target NSSF.

Step 504: The target NSSF determines a slice set for the target PLMN based on a mapping between a slice set for the HPLMN and a slice set for the target PLMN.

After receiving the slice set for the HPLMN, the HPLMN ID, and the target TAI, the target NSSF determines, based on the HPLMN ID, that the received slice set is a slice set for the HPLMN, and determines, based on the information about the target PLMN in the target TAI, to select the slice set for the target PLMN. Further, the target NSSF may determine the slice set for the target PLMN based on the mapping between a slice set for the HPLMN and a slice set for the target PLMN.

The target NSSF may store the mapping (as shown in Table 2) between a slice set for the target PLMN and a slice set for the HPLMN such that the target NSSF may determine, based on the mapping, the slice set that is for the target PLMN and that corresponds to the slice set for the HPLMN. For example, if the slice set that is for the HPLMN and that is received by the target NSSF includes the S-NSSAI-AA and the S-NSSAI-BB, it may be determined, based on Table 2, that the slice set for the target PLMN includes the S-NSSAI-C and the S-NSSAI-D.

Step 505: The target NSSF determines information about the target AMF that supports the slice set for the target PLMN.

The information about the target AMF may be a target AMF set (AMF set) that support the slice set for the target PLMN, and the target AMF set includes the target AMF that serves the UE and that is in the target PLMN.

The target NSSF determines the slice set for the target PLMN based on the slice set for the HPLMN, and then determines the information about the target AMF based on the slice set for the target PLMN. Therefore, it may be understood that the slice set for the HPLMN may be used to determine the target AMF. In addition, the target NSSF may further determine the information about the target AMF on a target side based on the received target TAI.

Step 506: The target NSSF sends the information about the target AMF to the source NSSF. Correspondingly, the source NSSF may receive the information about the target AMF.

For example, the target NSSF sends an Nnssf_NSSelection_Get response to the source NSSF, and the Nnssf_NSSelection_Get response carries the information about the target AMF.

Step 507: The source NSSF sends the information about the target AMF to the source AMF. Correspondingly, the source AMF may receive the information about the target AMF.

For example, the source NSSF sends the Nnssf_NSSelection_Get response to the source AMF, and the Nnssf_NSSelection_Get response carries the information about the target AMF.

After receiving the information about the target AMF, the source AMF selects an AMF, that is, the target AMF, from the AMF set indicated by the information about the target AMF.

Step 508: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of protocol data unit (PDU) sessions associated with the slice set for the HPLMN. Optionally, other context information of the UE may further be sent, for example, information about an SMF on a source side.

Optionally, after receiving the slice set for the HPLMN, the target AMF may obtain the slice set for the target PLMN based on the slice set for the HPLMN. For example, the target AMF may obtain the slice set for the target PLMN based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 2) between a slice set for the target PLMN and a slice set for the HPLMN. Alternatively, the configuration information includes a roaming agreement between the target PLMN and the HPLMN. The target AMF may determine the mapping (as shown in Table 2) between a slice set for the target PLMN and a slice set for the HPLMN according to the roaming agreement. In this case, the target AMF may determine, based on the slice set for the HPLMN and the mapping, the slice set that is for the target PLMN and that corresponds to the slice set for the HPLMN.

For example, if the slice set that is for the HPLMN and that is received by the target AMF includes the S-NSSAI-AA and the S-NSSAI-BB, it may be determined, based on Table 2, that the slice set for the target PLMN includes the S-NSSAI-C and the S-NSSAI-D.

Manner 2: The target AMF does not store the mapping between a slice set for the target PLMN and a slice set for the HPLMN. Alternatively, the target AMF does not store a roaming agreement between the target PLMN and the HPLMN. In this case, the target AMF sends first information to the target NSSF in the target PLMN, where the first information includes the slice set for the HPLMN, and the target AMF receives, from the target NSSF, the slice set for the target PLMN.

Optionally, the first information further includes first indication information. The first indication information is used to indicate the target NSSF to generate the slice set for the target PLMN.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and the HPLMN ID to the target NSSF.

For example, the target NSSF may return the slice set for the target PLMN to the target AMF by invoking an Nnssf_NSSelection_Get response service operation. Optionally, the target NSSF may alternatively return the mapping (as shown in Table 2) between a slice set for the target PLMN and a slice set for the HPLMN to the target AMF by invoking an Nnssf_NSSelection_Get response service operation. Correspondingly, the target AMF receives the mapping between a slice set for the HPLMN and a slice set for the target PLMN from the target NSSF.

For example, if the slice set that is for the HPLMN and that is sent by the target AMF to the target NSSF includes the S-NSSAI-AA and the S-NSSAI-BB, the target NSSF maps the S-NSSAI-AA and the S-NSSAI-BB to the S-NSSAI-C and the S-NSSAI-D based on Table 2. In this case, the slice set for the target PLMN is the S-NSSAI-C and the S-NSSAI-D.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, the source side does not send allowed NSSAI on the source side or the mapping between a slice set for the HPLMN and a slice set for the source PLMN to the target side, but sends the slice set that is for the HPLMN and that corresponds to the slice set for the source PLMN to the target side. This can avoid the following problems: (1) Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN. (2) The mapping between a slice set for the HPLMN and a slice set for the source PLMN is determined according to the roaming agreement between the source PLMN and the HPLMN. If the source AMF directly sends the mapping to the target side, a security risk of exposing the roaming agreement between the source PLMN and the HPLMN may exist.

Figure 6:
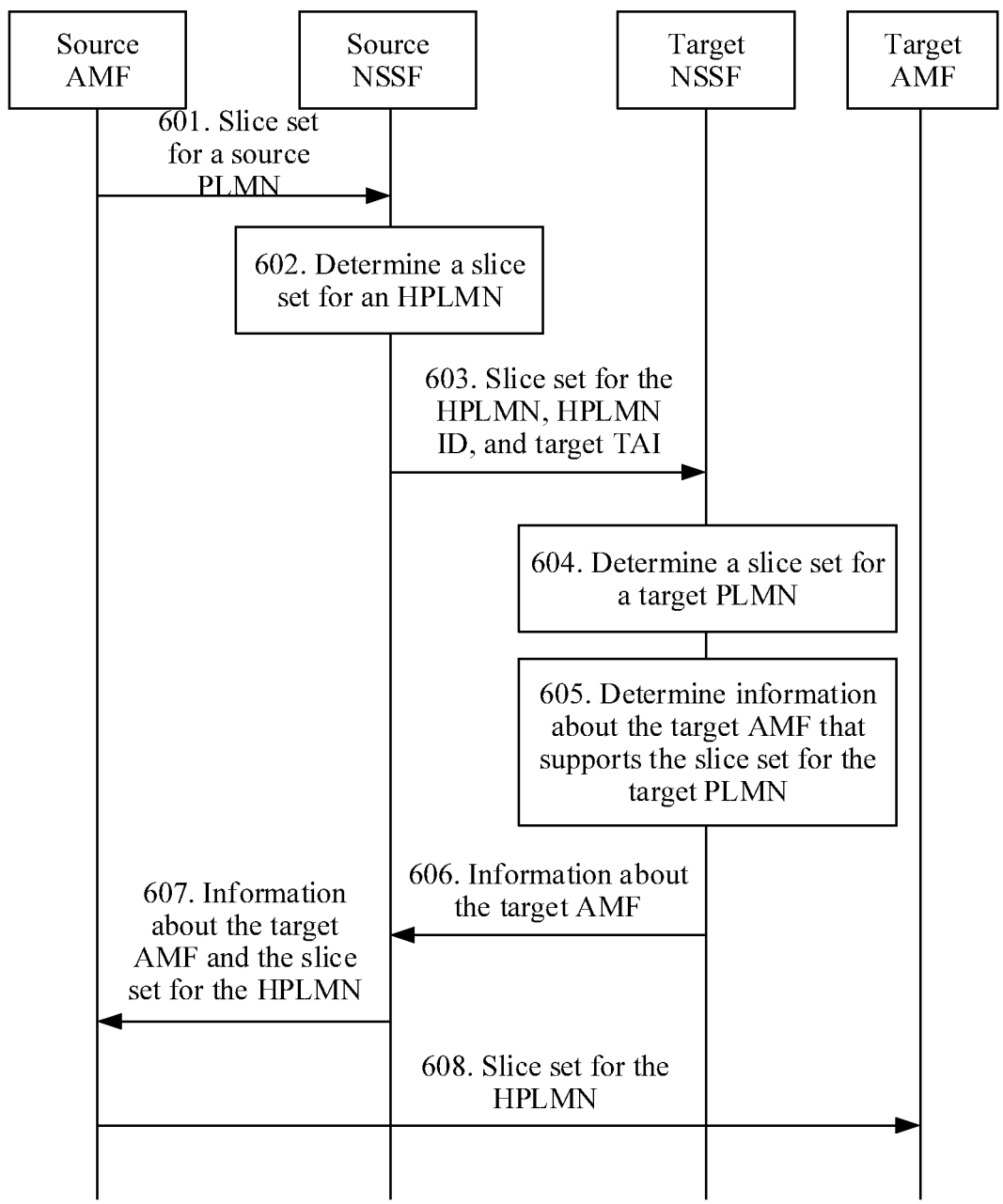
FIG. 6 is a schematic diagram of a communication method according to this application.

FIG. 6 is a schematic diagram of a second communication method according to this application. The method may be used for the scenario shown in FIG. 3 to select an appropriate target AMF for the UE. The method includes the following steps.

Step 601: When the UE is handed over from the source RAN to the target RAN, the source AMF sends a slice set for the source PLMN to the source NSSF. Correspondingly, the source NSSF may receive the slice set for the source PLMN.

For example, the source AMF may initiate a request message to the source NSSF by invoking an Nnssf_NSSelection_Get service operation of the NSSF in the source PLMN, and the request message carries the slice set for the source PLMN.

By invoking the foregoing service operation, the source AMF may further send a home PLMN ID of the UE and a target TAI to the source NSSF. The home PLMN ID of the UE is an HPLMN ID.

In an implementation, before step 601, the source AMF receives a handover required message sent by the source RAN, where the message may carry a target identifier (target ID), the target identifier includes an identifier of the target RAN and the target TAI of the target RAN, and the target TAI further includes information about the target PLMN (such as an ID of the target PLMN).

Optionally, before determining a slice set that is for an HPLMN and that corresponds to the slice set for the source PLMN, the source AMF determines that this handover is an inter-PLMN system handover, and therefore triggers execution of step 601.

For example, if the source AMF determines that the target PLMN included in the target TAI is different from the PLMN in which the source AMF is located, the source AMF may determine that this handover is an inter-PLMN system handover.

Step 602: The source NSSF determines, based on the slice set for the source PLMN and the HPLMN ID, the slice set that is for the HPLMN and that corresponds to the slice set for the source PLMN.

For example, if the source NSSF stores a mapping (as shown in Table 1) between a slice set for the source PLMN and a slice set for the HPLMN, the source NSSF may determine, based on the mapping, the slice set that is for the HPLMN and that corresponds to the slice set for the source PLMN. For example, if the slice set that is for the source PLMN and that is received by the source NSSF from the source AMF includes the S-NSSAI-A and the S-NSSAI-B, it is determined, based on Table 1, that the slice set that is for the HPLMN and that corresponds to the slice set for the source PLMN includes the S-NSSAI-AA and the S-NSSAI-BB.

Optionally, the mapping may be locally stored in the source NSSF.

Step 603 to step 606 are the same as step 503 to step 506 in the embodiment in FIG. 5. Refer to the foregoing descriptions.

Step 607: The source NSSF sends the information about the target AMF and the slice set for the HPLMN to the source AMF. Correspondingly, the source AMF may receive the information about the target AMF and the slice set for the HPLMN.

For example, the source NSSF sends an Nnssf_NSSelection_Get response to the source AMF, and the Nnssf_NSSelection_Get response carries the information about the target AMF and the slice set for the HPLMN.

In still another implementation, the source NSSF may alternatively separately send the information about the target AMF and the slice set for the HPLMN to the source AMF using two steps. For example, the source NSSF may send the slice set for the HPLMN to the source AMF in any step after step 602 and before step 608. The source NSSF may send the information about the target AMF to the source AMF after step 606 and before step 608.

After receiving the information about the target AMF, the source AMF selects an AMF, that is, the target AMF, from the AMF set indicated by the information about the target AMF.

Step 608: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of PDU sessions associated with the slice set for the HPLMN. Optionally, other context information of the UE may further be sent, for example, information about an SMF on a source side.

Optionally, after receiving the slice set for the HPLMN, the target AMF may obtain the slice set for the target PLMN based on the slice set for the HPLMN. For example, the target AMF may obtain the slice set for the target PLMN based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 2) between a slice set for the target PLMN and a slice set for the HPLMN. Alternatively, the configuration information includes a roaming agreement between the target PLMN and the HPLMN. The target AMF may determine the mapping (as shown in Table 2) between a slice set for the target PLMN and a slice set for the HPLMN according to the roaming agreement. In this case, the target AMF may determine, based on the slice set for the HPLMN and the mapping, the slice set that is for the target PLMN and that corresponds to the slice set for the HPLMN.

For example, if the slice set that is for the HPLMN and that is received by the target AMF includes the S-NSSAI-AA and the S-NSSAI-BB, it may be determined, based on Table 2, that the slice set for the target PLMN includes the S-NSSAI-C and the S-NSSAI-D.

Manner 2: The target AMF does not store the mapping between a slice set for the target PLMN and a slice set for the HPLMN. Alternatively, the target AMF does not store a roaming agreement between the target PLMN and the HPLMN. In this case, the target AMF sends first information to the target NSSF in the target PLMN, where the first information includes the slice set for the HPLMN, and the target AMF receives, from the target NSSF, the slice set for the target PLMN.

Optionally, the first information further includes first indication information. The first indication information is used to indicate the target NSSF to generate the slice set for the target PLMN.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and the HPLMN ID to the target NSSF.

For example, the target NSSF may return the slice set for the target PLMN to the target AMF by invoking an Nnssf_NSSelection_Get response service operation. Optionally, the target NSSF may alternatively return the mapping (as shown in Table 2) between a slice set for the target PLMN and a slice set for the HPLMN to the target AMF by invoking an Nnssf_NSSelection_Get response service operation. Correspondingly, the target AMF receives the mapping between a slice set for the HPLMN and a slice set for the target PLMN from the target NSSF.

For example, if the slice set that is for the HPLMN and that is sent by the target AMF to the target NSSF includes the S-NSSAI-AA and the S-NSSAI-BB, the target NSSF maps the S-NSSAI-AA and the S-NSSAI-BB to the S-NSSAI-C and the S-NSSAI-D based on Table 2. In this case, the slice set for the target PLMN is the S-NSSAI-C and the S-NSSAI-D.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, the source side does not send allowed NSSAI on the source side or the mapping between a slice set for the HPLMN and a slice set for the source PLMN to the target side, but sends the slice set that is for the HPLMN and that corresponds to the slice set for the source PLMN to the target side. This can avoid the following problems: (1) Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN. (2) The mapping between a slice set for the HPLMN and a slice set for the source PLMN is determined according to the roaming agreement between the source PLMN and the HPLMN. If the source AMF directly sends the mapping to the target side, a security risk of exposing the roaming agreement between the source PLMN and the HPLMN may exist.

Therefore, the present disclosure discloses a communication method, including, when a terminal device is handed over from a source access network device in a first area to a target access network device in a second area, obtaining, by a source AMF in the first area based on a slice set for the first area, information about a target AMF in the second area (referring to the descriptions of step 501, step 601, and step 607), and sending, by the source AMF, a slice set for an HPLMN of the terminal device to the target AMF, where the slice set for the HPLMN is corresponding to the slice set for the first area, and the slice set for the HPLMN is used to determine a slice set for the second area (referring to the descriptions of step 508 and step 608).

In a possible implementation, the first area is a source PLMN, and the second area is a target PLMN.

In a possible implementation, the source AMF determines, based on a mapping between a slice set for the source PLMN and a slice set for the HPLMN, the slice set that is for the HPLMN and that corresponds to the slice set for the source PLMN.

In a possible implementation, obtaining, by a source AMF based on a slice set for the first area, information about a target AMF in the second area includes sending, by the source AMF, the slice set for the HPLMN and information about the target PLMN to a first device, and receiving, by the source AMF from the first device, the information about the target AMF, where the first device is a source NSSF in the source PLMN (referring to the descriptions of step 502 and step 507).

In a possible implementation, the source AMF sends the slice set for the source PLMN to the source NSSF in the source PLMN, and the source AMF receives, from the source NSSF, the slice set for the HPLMN (referring to the descriptions of step 601 and step 607).

In a possible implementation, obtaining, by a source AMF based on a slice set for the first area, information about a target AMF in the second area includes sending, by the source AMF, the information about the target PLMN to the source NSSF in the source PLMN, and receiving, by the source AMF from the source NSSF, the information about the target AMF.

Therefore, the present disclosure discloses a communication method, including, when a terminal device is handed over from a source access network device in a source PLMN to a target access network device in a target PLMN, obtaining, by a first device in the source PLMN, a slice set that is for an HPLMN of the terminal device and that corresponds to a slice set for the source PLMN (referring to the descriptions of step 502 and step 602), sending, by the first device, the slice set for the HPLMN to a second device in the target PLMN, where the slice set for the HPLMN is used to determine a target AMF in the target PLMN, receiving, by the first device from the second device, information about the target AMF, and sending, by the first device, the information about the target AMF to a source AMF in the source PLMN (referring to the descriptions of step 503 and step 603).

In a possible implementation, the first device is a source NSSF in the source PLMN, and the second device is a target NSSF in the target PLMN.

In a possible implementation, obtaining, by a first device in the source PLMN, a slice set that is for an HPLMN and that corresponds to a slice set for the source PLMN includes receiving, by the first device from the source AMF, the slice set for the source PLMN, and determining the slice set that is for the HPLMN and that corresponds to the slice set for the source PLMN, or receiving, by the first device from the source AMF, the slice set for the HPLMN.

In a possible implementation, the first device receives, from the source AMF, information about the target PLMN, and the first device selects the second device based on the information about the target PLMN.

Therefore, the present disclosure discloses a communication method, including when a terminal device is handed over from a source access network device in a source PLMN to a target access network device in a target PLMN, receiving, by a target NSSF in the target PLMN from a source NSSF in the source PLMN, a slice set for an HPLMN of the terminal device (referring to the descriptions of step 503 and step 603), determining, by the target NSSF, information about a target AMF that supports a slice set for the target PLMN, where the slice set for the target PLMN corresponds to the slice set for the HPLMN, and sending, by the target NSSF, the information about the target AMF to the source NSSF (referring to the descriptions of step 506 and step 606).

In a possible implementation, the target NSSF determines the slice set for the target PLMN based on a mapping between a slice set for the HPLMN and a slice set for the target PLMN. Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE.

Figure 7:
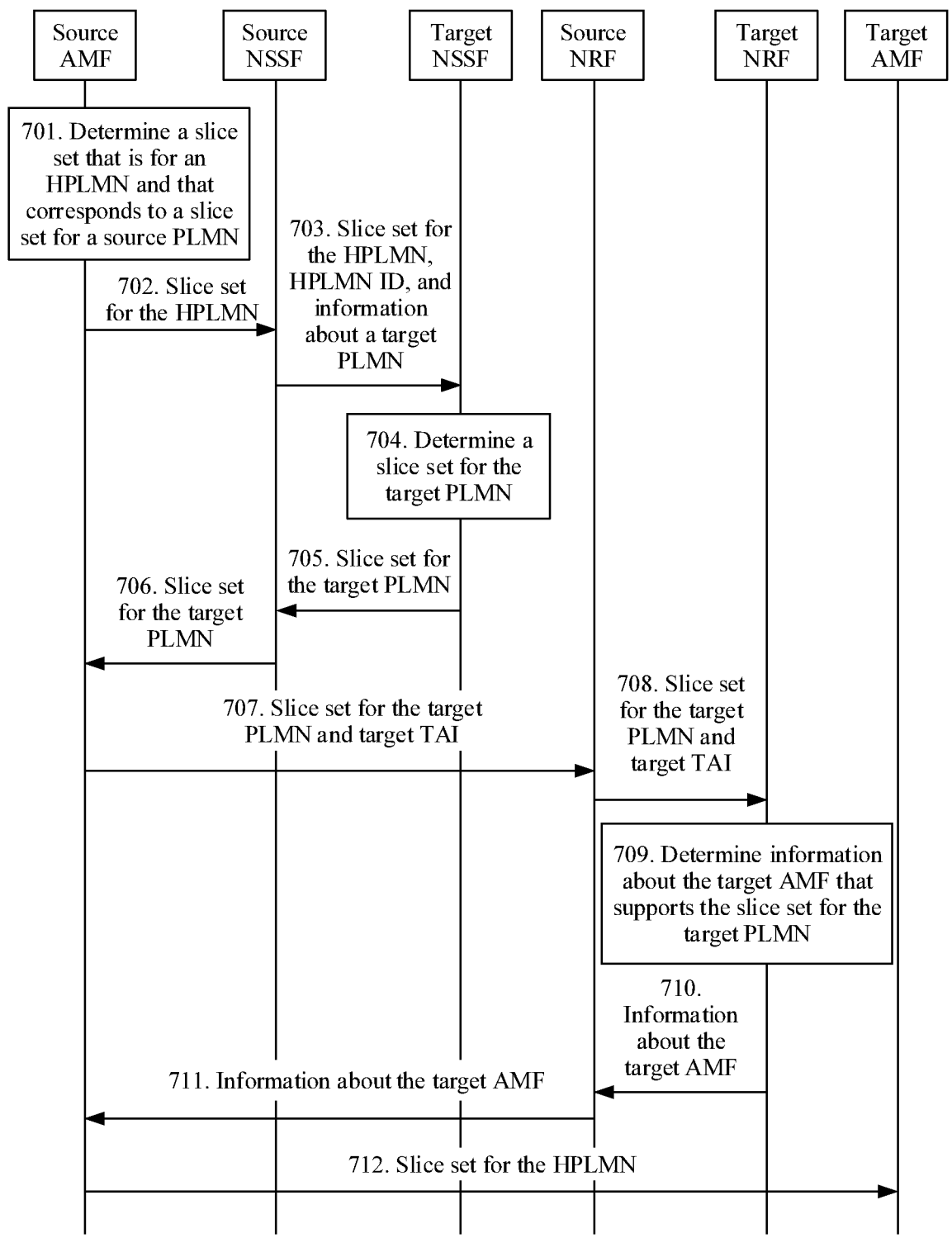
FIG. 7 is a schematic diagram of a communication method according to this application.

FIG. 7 is a schematic diagram of a third communication method according to this application. The method may be used for the scenario shown in FIG. 3 to select an appropriate target AMF for the UE. The method includes the following steps.

Step 701: When the UE is handed over from the source RAN to the target RAN, the source AMF determines, based on a slice set for the source PLMN, a slice set that is for an HPLMN and that corresponds to the slice set for the source PLMN.

For example, if the source AMF stores a mapping (as shown in Table 1) between a slice set for the source PLMN and a slice set for the HPLMN, the source AMF may determine, based on the mapping, the slice set that is for the HPLMN and that corresponds to the slice set for the source PLMN. For example, it is determined, based on Table 1, that the slice set that is for the HPLMN and that corresponds to the slice set (including the S-NSSAI-A and the S-NSSAI-B) in the source PLMN includes the S-NSSAI-AA and the S-NSSAI-BB.

Optionally, the mapping may be stored in a context of the UE.

In an implementation, before step 701, the source AMF receives a handover required message sent by the source RAN, where the message may carry a target identifier (target ID), the target identifier includes an identifier of the target RAN and a target TAI of the target RAN, and the target TAI further includes information about a target PLMN (such as an ID of the target PLMN).

Optionally, before determining the slice set that is for the HPLMN and that corresponds to the slice set for the source PLMN, the source AMF determines that this handover is an inter-PLMN system handover, and therefore triggers execution of step 701.

For example, if the source AMF determines that the target PLMN included in the target TAI is different from the PLMN in which the source AMF is located, the source AMF may determine that this handover is an inter-PLMN system handover.

Step 702: The source AMF sends the slice set for the HPLMN to the source NSSF. Correspondingly, the source NSSF may receive the slice set for the HPLMN.

For example, the source AMF initiates a request message to the source NSSF by invoking an Nnssf_NSSelection_Get service operation of the source NSSF, and the message carries the slice set for the HPLMN.

By invoking the foregoing service operation, the source AMF further sends a home PLMN ID of the UE and the information about the target PLMN to the source NSSF. The home PLMN ID of the UE is an HPLMN ID.

Step 703: The source NSSF sends the slice set for the HPLMN, the HPLMN ID, and the information about the target PLMN to the target NSSF. Correspondingly, the target NSSF may receive the slice set for the HPLMN, the HPLMN ID, and the information about the target PLMN.

For example, the source NSSF initiates a request message to the target NSSF by invoking an Nnssf_NSSelection_Get service operation of the target NSSF, and the request message carries the slice set for the HPLMN, the HPLMN ID, and the information about the target PLMN.

Before sending the slice set for the HPLMN to the target NSSF, the source NSSF determines (or selects) the target NSSF based on the information about the target PLMN, to send the slice set for the HPLMN to the target NSSF.

Step 704: The target NSSF determines a slice set for the target PLMN based on a mapping between a slice set for the HPLMN and a slice set for the target PLMN.

After receiving the slice set for the HPLMN, the HPLMN ID, and the information about the target PLMN, the target NSSF determines, based on the HPLMN ID, that the received slice set is a slice set for the HPLMN, and determines, based on the information about the target PLMN in the target TAI, to select the slice set for the target PLMN. Further, the target NSSF may determine the slice set for the target PLMN based on the mapping between a slice set for the HPLMN and a slice set for the target PLMN.

The target NSSF may store the mapping (as shown in Table 2) between a slice set for the target PLMN and a slice set for the HPLMN such that the target NSSF may determine, based on the mapping, the slice set that is for the target PLMN and that corresponds to the slice set for the HPLMN. For example, if the slice set that is for the HPLMN and that is received by the target NSSF includes the S-NSSAI-AA and the S-NSSAI-BB, it may be determined, based on Table 2, that the slice set for the target PLMN includes the S-NSSAI-C and the S-NSSAI-D.

Step 705: The target NSSF sends the slice set for the target PLMN to the source NSSF. Correspondingly, the source NSSF may receive the slice set for the target PLMN.

For example, the target NSSF sends an Nnssf_NSSelection_Get response to the source NSSF, and the nssf_NSSelection_Get response carries the slice set for the target PLMN.

Step 706: The source NSSF sends the slice set for the target PLMN to the source AMF. Correspondingly, the source AMF may receive the slice set for the target PLMN.

For example, the source NSSF sends the Nnssf_NSSelection_Get response to the source AMF, and the Nnssf_NSSelection_Get response carries the slice set for the target PLMN.

Step 707: The source AMF sends the slice set for the target PLMN and the target TAI to the source NRF. Correspondingly, the source NRF may receive the slice set for the target PLMN and the target TAI.

For example, the source AMF sends a request message by invoking an Nnrf_NFDiscovery_Request service operation of the source NRF, to request to discover an AMF network element. The request message carries the slice set for the target PLMN and the target TAI. Optionally, the request message further carries that a requested network element type is an AMF network element.

Step 708: The source NRF sends the slice set for the target PLMN and the target TAI to the target NRF. Correspondingly, the target NRF may receive the slice set for the target PLMN and the target TAI.

For example, the source NRF sends a request message by invoking an Nnrf_NFDiscovery_Request service operation of the target NRF. The request message carries the slice set for the target PLMN and the target TAI. Optionally, the request message further carries that a requested network element type is an AMF network element.

Before sending the slice set for the target PLMN to the target NRF, the source NRF may further determine (or select) the target NRF based on the information about the target PLMN that is carried in the target TAI, to send the slice set for the target PLMN to the target NRF.

Step 709: The target NRF determines information about a target AMF that supports the slice set for the target PLMN.

The target NRF determines the information about the target AMF based on the slice set for the target PLMN. Therefore, it may be understood that the slice set for the target PLMN may be used to determine the target AMF.

The information about the target AMF may be a list of candidate target AMFs (list of candidate AMFs) that support the slice set for the target PLMN, and the list of candidate target AMFs includes the target AMF that serves the UE and that is in the target PLMN.

Step 710: The target NRF sends the information about the target AMF to the source NRF. Correspondingly, the source NRF may receive the information about the target AMF.

For example, the target NRF sends an Nnrf_NFDiscovery_Response to the source NRF, and the Nnrf_NFDiscovery_Response carries the information about the target AMF.

Step 711: The source NRF sends information about the target AMF to the source AMF. Correspondingly, the source AMF may receive the information about the target AMF.

For example, the source NRF sends the Nnrf_NFDiscovery_Response to the source AMF, and the Nnrf_NFDiscovery_Response carries the information about the target AMF.

Optionally, in step 709, the target NRF determines the list of candidate target AMFs (list of candidate AMFs) that support the slice set for the target PLMN, and the list of candidate AMFs includes the target AMF. In this way, in step 710, the target NRF sends the list of candidate AMFs to the source NRF. In step 711, the source NRF sends the list of candidate AMFs to the source AMF, and the source AMF selects an AMF, that is, the target AMF, from the list of candidate AMFs.

Step 712: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of PDU sessions associated with the slice set for the HPLMN. Optionally, other context information of the UE may further be sent, for example, information about an SMF on a source side.

Optionally, after receiving the slice set for the HPLMN, the target AMF may obtain the slice set for the target PLMN based on the slice set for the HPLMN. For example, the target AMF may obtain the slice set for the target PLMN based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 2) between a slice set for the target PLMN and a slice set for the HPLMN. Alternatively, the configuration information includes a roaming agreement between the target PLMN and the HPLMN. The target AMF may determine the mapping (as shown in Table 2) between a slice set for the target PLMN and a slice set for the HPLMN according to the roaming agreement. In this case, the target AMF may determine, based on the slice set for the HPLMN and the mapping, the slice set that is for the target PLMN and that corresponds to the slice set for the HPLMN.

For example, if the slice set that is for the HPLMN and that is received by the target AMF includes the S-NSSAI-AA and the S-NSSAI-BB, it may be determined, based on Table 2, that the slice set for the target PLMN includes the S-NSSAI-C and the S-NSSAI-D.

Manner 2: The target AMF does not store the mapping between a slice set for the target PLMN and a slice set for the HPLMN. Alternatively, the target AMF does not store a roaming agreement between the target PLMN and the HPLMN. In this case, the target AMF sends first information to the target NSSF in the target PLMN, where the first information includes the slice set for the HPLMN, and the target AMF receives, from the target NSSF, the slice set for the target PLMN.

Optionally, the first information further includes first indication information. The first indication information is used to indicate the target NSSF to generate the slice set for the target PLMN.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and the HPLMN ID to the target NSSF.

For example, the target NSSF may return the slice set for the target PLMN to the target AMF by invoking an Nnssf_NSSelection_Get response service operation. Optionally, the target NSSF may alternatively return the mapping (as shown in Table 2) between a slice set for the target PLMN and a slice set for the HPLMN to the target AMF by invoking an Nnssf_NSSelection_Get response service operation. Correspondingly, the target AMF receives the mapping between a slice set for the HPLMN and a slice set for the target PLMN from the target NSSF.

For example, if the slice set that is for the HPLMN and that is sent by the target AMF to the target NSSF includes the S-NSSAI-AA and the S-NSSAI-BB, the target NSSF maps the S-NSSAI-AA and the S-NSSAI-BB to the S-NSSAI-C and the S-NSSAI-D based on Table 2. In this case, the slice set for the target PLMN is the S-NSSAI-C and the S-NSSAI-D.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, the source side does not send allowed NSSAI on the source side or the mapping between a slice set for the HPLMN and a slice set for the source PLMN to a target side, but sends the slice set that is for the HPLMN and that corresponds to the slice set for the source PLMN to the target side. This can avoid the following problems. Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN.

Figure 8:
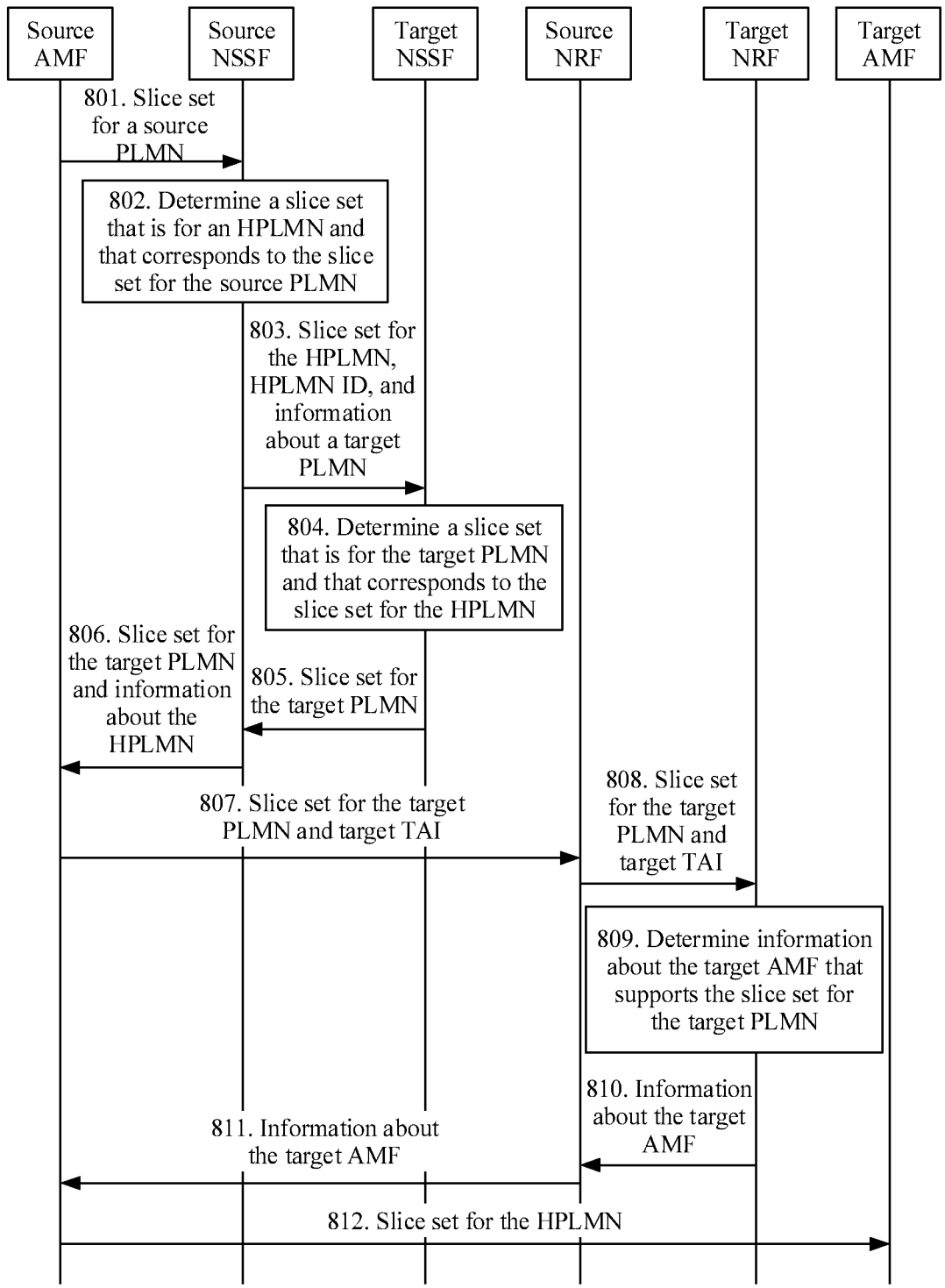
FIG. 8 is a schematic diagram of a communication method according to this application.

FIG. 8 is a schematic diagram of a fourth communication method according to this application. The method may be used for the scenario shown in FIG. 3 to select an appropriate target AMF for the UE. The method includes the following steps.

Step 801: When the UE is handed over from the source RAN to the target RAN, the source AMF sends a slice set for the source PLMN to the source NSSF. Correspondingly, the source NSSF may receive the slice set for the source PLMN.

For example, the source AMF initiates a request message to the source NSSF by invoking an Nnssf_NSSelection_Get service operation of the source NSSF, and the message carries the slice set for the source PLMN.

By invoking the foregoing service operation, the source AMF may further send a home PLMN ID of the UE and information about a target PLMN to the source NSSF. The home PLMN ID of the UE is an HPLMN ID.

In an implementation, before step 801, the source AMF receives a handover required message sent by the source RAN, where the message may carry a target identifier (target ID), the target identifier includes an identifier of the target RAN and a target TAI of the target RAN, and the target TAI further includes the information about the target PLMN (such as an ID of the target PLMN).

Optionally, before determining a slice set that is for an HPLMN and that corresponds to the slice set for the source PLMN, the source AMF determines that this handover is an inter-PLMN system handover, and therefore triggers execution of step 801.

For example, if the source AMF determines that the target PLMN included in the target TAI is different from the PLMN in which the source AMF is located, the source AMF may determine that this handover is an inter-PLMN system handover.

Step 802: The source NSSF determines, based on the slice set for the source PLMN and the HPLMN ID, the slice set that is for the HPLMN and that corresponds to the slice set for the source PLMN.

For example, if the source NSSF stores a mapping (as shown in Table 1) between a slice set for the source PLMN and a slice set for the HPLMN, the source NSSF may determine, based on the mapping, the slice set that is for the HPLMN and that corresponds to the slice set for the source PLMN. For example, if the slice set that is for the source PLMN and that is received by the source NSSF from the source AMF includes the S-NSSAI-A and the S-NSSAI-B, it is determined, based on Table 1, that the slice set that is for the HPLMN and that corresponds to the slice set for the source PLMN includes the S-NSSAI-AA and the S-NSSAI-BB.

Optionally, the mapping may be locally stored in the source NSSF.

Step 803 to step 805 are the same as step 703 to step 705 in the embodiment in FIG. 7. Refer to the foregoing descriptions.

Step 806: The source NSSF sends the slice set for the target PLMN and the slice set for the HPLMN to the source AMF. Correspondingly, the source AMF may receive the slice set for the target PLMN and the slice set for the HPLMN.

For example, the source NSSF sends an Nnssf_NSSelection_Get response to the source AMF, and the Nnssf_NSSelection_Get response carries the slice set for the target PLMN and the slice set for the HPLMN.

In still another implementation, the source NSSF may alternatively separately send the slice set for the target PLMN and the slice set for the HPLMN to the source AMF using two steps. For example, the source NSSF may send the slice set for the HPLMN to the source AMF in any step after step 802 and before step 812. The source NSSF may send the slice set for the target PLMN to the source AMF after step 805 and before step 807.

Step 807 to step 812 are the same as step 707 to step 712 in the embodiment in FIG. 7. Refer to the foregoing descriptions.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, a source side does not send allowed NSSAI on the source side or the mapping between a slice set for the HPLMN and a slice set for the source PLMN to a target side, but sends the slice set that is for the HPLMN and that corresponds to the slice set for the source PLMN to the target side. This can avoid the following problems. Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN.

Therefore, the present disclosure discloses a communication method, including, when a terminal device is handed over from a source access network device in a first area to a target access network device in a second area, obtaining, by a source AMF in the first area based on a slice set for the first area, information about a target AMF in the second area (referring to the descriptions of step 711 and step 811), and sending, by the source AMF, a slice set for an HPLMN of the terminal device to the target AMF, where the slice set for the HPLMN is corresponding to the slice set for the first area, and the slice set for the HPLMN is used to determine a slice set for the second area (referring to the descriptions of step 712 and step 812).

In a possible implementation, the first area is a source PLMN, and the second area is a target PLMN.

In a possible implementation, the source AMF determines, based on a mapping between a slice set for the source PLMN and a slice set for the HPLMN, the slice set that is for the HPLMN and that corresponds to the slice set for the source PLMN.

In a possible implementation, obtaining, by a source AMF based on a slice set for the first area, information about a target AMF in the second area includes sending, by the source AMF, the slice set for the HPLMN and information about the target PLMN to a first device (referring to the descriptions of step 702), and receiving, by the source AMF from the first device, the information about the target AMF (referring to the descriptions of step 711), where the first device is a source NSSF in the source PLMN.

In a possible implementation, obtaining, by a source AMF based on a slice set for the first area, information about a target AMF in the second area includes sending, by the source AMF, the slice set for the HPLMN to the source NSSF in the source PLMN, receiving, by the source AMF from the source NSSF, the slice set for the target PLMN, sending, by the source AMF, the slice set for the target PLMN and the information about the target PLMN to a source NRF in the source PLMN, and receiving, by the source AMF from the source NRF, the information about the target AMF (referring to the descriptions of step 706 and step 806).

In a possible implementation, the source AMF sends the slice set for the source PLMN to the source NSSF in the source PLMN (referring to the descriptions of step 801), and the source AMF receives, from the source NSSF, the slice set for the HPLMN (referring to the descriptions of step 806).

In a possible implementation, obtaining, by a source AMF based on a slice set for the first area, information about a target AMF in the second area includes receiving, by the source AMF from the source NSSF in the source PLMN, the slice set for the target PLMN, sending, by the source AMF, the slice set for the target PLMN and the information about the target PLMN to the source NRF in the source PLMN (referring to the descriptions of step 707 and step 807), and receiving, by the source AMF from the source NRF, the information about the target AMF (referring to the descriptions of step 711 and step 811).

Therefore, the present disclosure discloses a communication method, including, when a terminal device is handed over from a source access network device in a source PLMN to a target access network device in a target PLMN, obtaining, by a source NSSF in the source PLMN, a slice set that is for an HPLMN of the terminal device and that corresponds to a slice set for the source PLMN (referring to descriptions of step 702 and step 802), sending, by the source NSSF, the slice set for the HPLMN to a target NSSF in the target PLMN, where the slice set for the HPLMN is used to determine a slice set for the target PLMN (referring to the descriptions of step 703 and step 803), receiving, by the source NSSF from the target NSSF, the slice set for the target PLMN, and sending, by the source NSSF, the slice set for the target PLMN to a source AMF (referring to the descriptions of step 706 and step 806).

In a possible implementation, obtaining, by a source NSSF in the source PLMN, a slice set that is for an HPLMN of the terminal device and that corresponds to a slice set for the source PLMN includes receiving, by the source NSSF from the source AMF, the slice set for the source PLMN, and determine the slice set that is for the HPLMN and that corresponds to the slice set for the source PLMN, or receiving, by the source NSSF from the source AMF, the slice set for the HPLMN.

In a possible implementation, the source NSSF receives, from the source AMF, information about the target PLMN, and the source NSSF selects the target NSSF based on the information about the target PLMN.

Therefore, the present disclosure discloses a communication method, including, when a terminal device is handed over from a source access network device in a source PLMN to a target access network device in a target PLMN, a source NRF in the source PLMN receives, from a source AMF in the source PLMN, a slice set for the target PLMN (referring to the descriptions of step 707 and step 807), sending, by the source NRF, the slice set for the target PLMN to a target NRF in the target PLMN (referring to the descriptions of step 708 and step 808), receiving, by the source NRF from the target NRF, information about a target AMF, and sending, by the source NRF, the information about the target AMF to the source AMF (referring to the descriptions of step 711 and step 811).

In a possible implementation, the source NRF receives, from the source AMF, information about the target PLMN, and the source NRF determines the target NRF based on the information about the target PLMN.

Therefore, the present disclosure discloses a communication method, including, when a terminal device is handed over from a source access network device in a source PLMN to a target access network device in a target PLMN, receiving, by a target NSSF in the target PLMN from a source NSSF in the source PLMN, a slice set for an HPLMN of the terminal device (referring to the descriptions of step 703 and step 803), and sending, by the target NSSF to the source NSSF, a slice set that is for the target PLMN and that corresponds to the slice set for the HPLMN, where the slice set for the target PLMN is used to determine information about a target AMF in the target PLMN (referring to the descriptions of step 705 and step 805).

In a possible implementation, the target NSSF determines the slice set for the target PLMN based on a mapping between a slice set for the HPLMN and a slice set for the target PLMN.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE.

Figure 9:
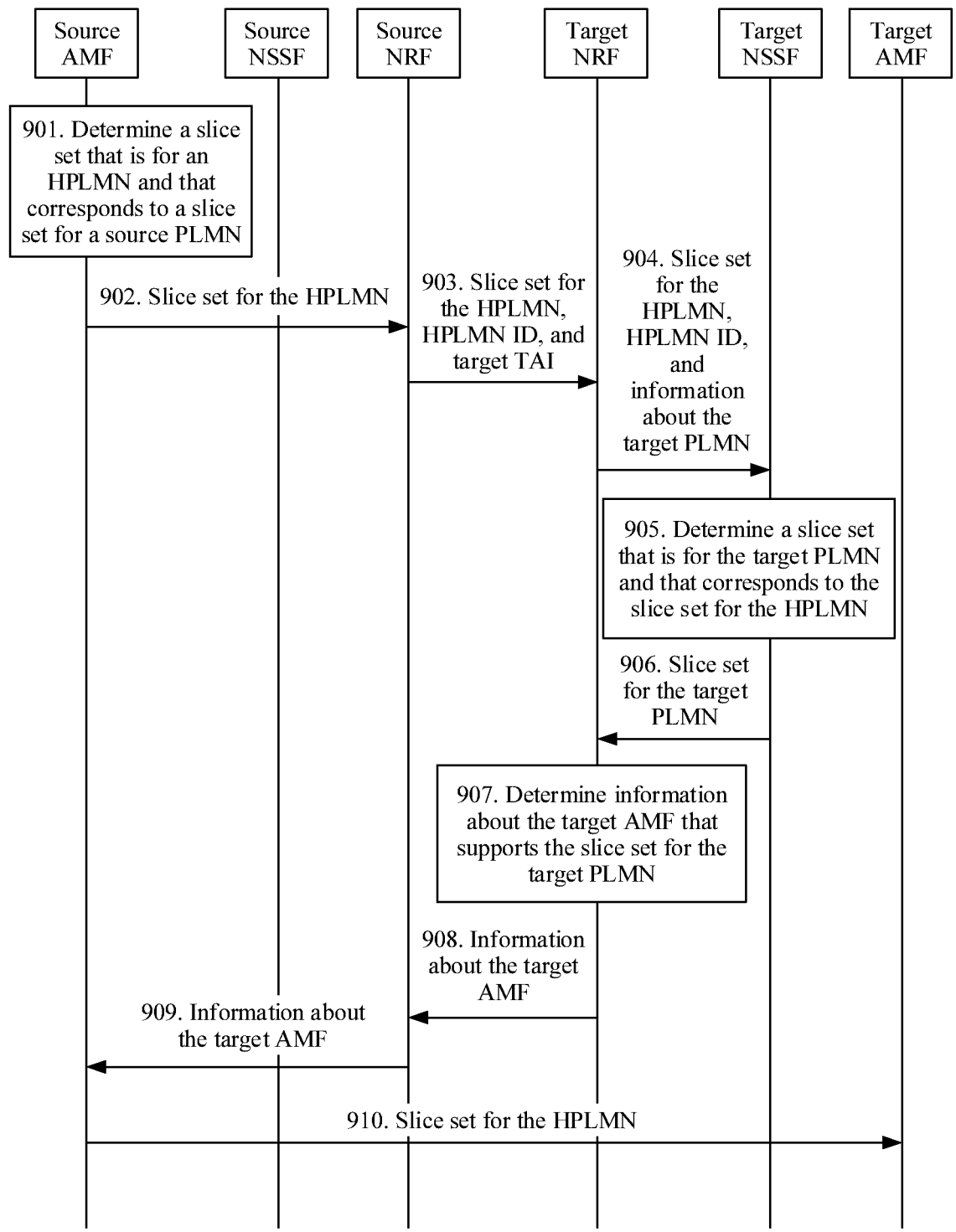
FIG. 9 is a schematic diagram of a communication method according to this application.

FIG. 9 is a schematic diagram of a fifth communication method according to this application. The method may be used for the scenario shown in FIG. 3 to select an appropriate target AMF for the UE. The method includes the following steps.

Step 901: When the UE is handed over from the source RAN to the target RAN, the source AMF determines, based on a slice set for the source PLMN, a slice set that is for an HPLMN and that corresponds to the slice set for the source PLMN.

For example, if the source AMF stores a mapping (as shown in Table 1) between a slice set for the source PLMN and a slice set for the HPLMN, the source AMF may determine, based on the mapping, the slice set that is for the HPLMN and that corresponds to the slice set for the source PLMN. For example, it is determined, based on Table 1, that the slice set that is for the HPLMN and that corresponds to the slice set (including the S-NSSAI-A and the S-NSSAI-B) in the source PLMN includes the S-NSSAI-AA and the S-NSSAI-BB.

Optionally, the mapping may be stored in a context of the UE.

In an implementation, before step 901, the source AMF receives a handover required message from the source RAN, where the message may carry a target identifier (target ID), the target identifier includes an identifier of the target RAN and a target TAI of the target RAN, and the target TAI further includes information about the target PLMN (such as an ID of the target PLMN).

Optionally, before determining the slice set that is for the HPLMN and that corresponds to the slice set for the source PLMN, the source AMF determines that this handover is an inter-PLMN handover, and therefore triggers execution of step 901.

For example, if the source AMF determines that the target PLMN included in the target TAI is different from the PLMN in which the source AMF is located, the source AMF may determine that this handover is an inter-PLMN system handover.

Step 902: The source AMF sends the slice set for the HPLMN to the source NRF. Correspondingly, the source NRF may receive the slice set for the HPLMN.

For example, the source AMF sends a request message by invoking an Nnrf_NFDiscovery_Request service operation of the source NRF, to request to discover an AMF network element. The request message carries the slice set for the HPLMN. Optionally, the request message may further carry a requested network element type being an AMF network element.

By invoking the foregoing service operation, the source AMF may further send a home PLMN ID of the UE and the target TAI to the source NSSF. The home PLMN ID of the UE is an HPLMN ID.

Optionally, in an implementation, the source AMF may send the slice set for the HPLMN, the HPLMN ID, and the target TAI to the source NSSF, and then the source NSSF sends the slice set for the HPLMN, the HPLMN ID, and the target TAI to the source NRF, that is, the source AMF sends the slice set for the HPLMN, the HPLMN ID, and the target TAI to the source NRF through the source NSSF.

Step 903: The source NRF sends the slice set for the HPLMN, the HPLMN ID, and the target TAI to the target NRF. Correspondingly, the target NRF may receive the slice set for the HPLMN, the HPLMN ID, and the target TAI.

For example, the source NRF sends a request message by invoking an Nnrf_NFDiscovery_Request service operation of the target NRF. The request message carries the slice set for the HPLMN, the home PLMN ID of the UE, and the target TAI. Optionally, the request message may further carry a requested network element type being an AMF network element.

Before sending the slice set for the HPLMN to the target NRF, the source NRF may further determine (or select) the target NRF based on the information about the target PLMN that is carried in the target TAI, to send the slice set for the HPLMN to the target NRF.

Step 904: The target NRF sends the slice set for the HPLMN, the HPLMN ID, and the information about the target PLMN to the target NSSF. Correspondingly, the target NSSF may receive the slice set for the HPLMN, the HPLMN ID, and the information about the target PLMN.

For example, the target NRF sends a request message by invoking an Nnssf_NSSelection_Get service operation of the target NSSF. The request message carries the slice set for the HPLMN, the HPLMN ID, and the information about the target PLMN.

Step 905: The target NSSF determines a slice set for the target PLMN based on a mapping between a slice set for the HPLMN and a slice set for the target PLMN.

After receiving the slice set for the HPLMN, the HPLMN ID, and the information about the target PLMN, the target NSSF determines, based on the HPLMN ID, that the received slice set is a slice set for the HPLMN, and determines, based on the information about the target PLMN, to select the slice set for the target PLMN. Further, the target NSSF may determine the slice set for the target PLMN based on the mapping between a slice set for the HPLMN and a slice set for the target PLMN.

The target NSSF may store the mapping (as shown in Table 2) between a slice set for the target PLMN and a slice set for the HPLMN such that the target NSSF may determine, based on the mapping, the slice set that is for the target PLMN and that corresponds to the slice set for the HPLMN. For example, if the slice set that is for the HPLMN and that is received by the target NSSF includes the S-NSSAI-AA and the S-NSSAI-BB, it may be determined, based on Table 2, that the slice set for the target PLMN includes the S-NSSAI-C and the S-NSSAI-D.

Step 906: The target NSSF sends the slice set for the target PLMN to the target NRF. Correspondingly, the target NRF may receive the slice set for the target PLMN.

For example, the target NSSF sends an Nnssf_NSSelection_Get response to the target NRF, and the Nnssf_NSSelection_Get response carries the slice set for the target PLMN.

Step 907: The target NRF determines information about a target AMF that supports the slice set for the target PLMN.

The target NRF determines the information about the target AMF based on the slice set for the target PLMN. Therefore, it may be understood that the slice set for the target PLMN may be used to determine the target AMF.

The information about the target AMF may be a list of candidate target AMFs (list of candidate AMFs) that support the slice set for the target PLMN, and the list of candidate target AMFs includes the target AMF that serves the UE and that is in the target PLMN.

Step 908: The target NRF sends the information about the target AMF to the source NRF. Correspondingly, the source NRF may receive the information about the target AMF.

For example, the target NRF sends an Nnrf_NFDiscovery_Response to the source NRF, and the Nnrf_NFDiscovery_Response carries the information about the target AMF.

Step 909: The source NRF sends the information about the target AMF to the source AMF. Correspondingly, the source AMF may receive the information about the target AMF.

For example, the source NRF sends the Nnrf_NFDiscovery_Response to the source AMF, and the Nnrf_NFDiscovery_Response carries the information about the target AMF.

Optionally, in step 907, the target NRF determines the list of candidate target AMFs (list of candidate AMFs) that support the slice set for the target PLMN, and the list of candidate AMFs includes the target AMF. In this way, in step 908, the target NRF sends the list of candidate AMFs to the source NRF. In step 909, the source NRF sends the list of candidate AMFs to the source AMF, and the source AMF selects an AMF, that is, the target AMF, from the list of candidate AMFs.

Step 910: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of PDU sessions associated with the slice set for the HPLMN. Optionally, other context information of the UE may further be sent, for example, information about an SMF on a source side.

Optionally, after receiving the slice set for the HPLMN, the target AMF may obtain the slice set for the target PLMN based on the slice set for the HPLMN. For example, the target AMF may obtain the slice set for the target PLMN based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 2) between a slice set for the target PLMN and a slice set for the HPLMN. Alternatively, the configuration information includes a roaming agreement between the target PLMN and the HPLMN. The target AMF may determine the mapping (as shown in Table 2) between a slice set for the target PLMN and a slice set for the HPLMN according to the roaming agreement. In this case, the target AMF may determine, based on the slice set for the HPLMN and the mapping, the slice set that is for the target PLMN and that corresponds to the slice set for the HPLMN.

For example, if the slice set that is for the HPLMN and that is received by the target AMF includes the S-NSSAI-AA and the S-NSSAI-BB, it may be determined, based on Table 2, that the slice set for the target PLMN includes the S-NSSAI-C and the S-NSSAI-D.

Manner 2: The target AMF does not store the mapping between a slice set for the target PLMN and a slice set for the HPLMN. Alternatively, the target AMF does not store a roaming agreement between the target PLMN and the HPLMN. In this case, the target AMF sends first information to the target NSSF in the target PLMN, where the first information includes the slice set for the HPLMN, and the target AMF receives, from the target NSSF, the slice set for the target PLMN.

Optionally, the first information further includes first indication information. The first indication information is used to indicate the target NSSF to generate the slice set for the target PLMN.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and the HPLMN ID to the target NSSF.

For example, the target NSSF may return the slice set for the target PLMN to the target AMF by invoking an Nnssf_NSSelection_Get response service operation. Optionally, the target NSSF may alternatively return the mapping (as shown in Table 2) between a slice set for the target PLMN and a slice set for the HPLMN to the target AMF by invoking an Nnssf_NSSelection_Get response service operation. Correspondingly, the target AMF receives the mapping between a slice set for the HPLMN and a slice set for the target PLMN from the target NSSF.

For example, if the slice set that is for the HPLMN and that is sent by the target AMF to the target NSSF includes the S-NSSAI-AA and the S-NSSAI-BB, the target NSSF maps the S-NSSAI-AA and the S-NSSAI-BB to the S-NSSAI-C and the S-NSSAI-D based on Table 2. In this case, the slice set for the target PLMN is the S-NSSAI-C and the S-NSSAI-D.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, the source side does not send allowed NSSAI on the source side or the mapping between a slice set for the HPLMN and a slice set for the source PLMN to a target side, but sends the slice set that is for the HPLMN and that corresponds to the slice set for the source PLMN to the target side. This can avoid the following problems: (1) Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN. (2) The mapping between a slice set for the HPLMN and a slice set for the source PLMN is determined according to the roaming agreement between the source PLMN and the HPLMN. If the source AMF directly sends the mapping to the target side, a security risk of exposing the roaming agreement between the source PLMN and the HPLMN may exist.

Therefore, the present disclosure discloses a communication method, including when a terminal device is handed over from a source access network device in a first area to a target access network device in a second area, obtaining, by a source AMF in the first area based on a slice set for the first area, information about a target AMF in the second area (referring to the descriptions of step 909), and sending, by the source AMF, a slice set for an HPLMN of the terminal device to the target AMF, where the slice set for the HPLMN is corresponding to the slice set for the first area, and the slice set for the HPLMN is used to determine a slice set for the second area (referring to the descriptions of step 910).

In a possible implementation, the first area is a source PLMN, and the second area is a target PLMN.

In a possible implementation, the source AMF determines, based on a mapping between a slice set for the source PLMN and a slice set for the HPLMN, the slice set that is for the HPLMN and that corresponds to the slice set for the source PLMN.

In a possible implementation, obtaining, by a source AMF based on a slice set for the first area, information about a target AMF in the second area includes sending, by the source AMF, the slice set for the HPLMN and information about the target PLMN to a first device (referring to the descriptions of step 902), and receiving, by the source AMF from the first device, the information about the target AMF, where the first device is a source NRF in the source PLMN (referring to the descriptions of step 909).

Therefore, the present disclosure discloses a communication method, including, when a terminal device is handed over from a source access network device in a source PLMN to a target access network device in a target PLMN, obtaining, by a first device in the source PLMN, a slice set that is for an HPLMN of the terminal device and that corresponds to a slice set for the source PLMN (referring to the descriptions of step 902), sending, by the first device, the slice set for the HPLMN to a second device in the target PLMN, where the slice set for the HPLMN is used to determine a target AMF in the target PLMN (referring to the descriptions in step 903), receiving, by the first device from the second device, information about the target AMF, and sending, by the first device, the information about the target AMF to a source AMF in the source PLMN (referring to the descriptions of step 908).

In a possible implementation, the first device is a source NRF in the source PLMN, and the second device is a target NRF in the target PLMN.

In a possible implementation, obtaining, by a first device in the source PLMN, a slice set that is for an HPLMN and that corresponds to a slice set for the source PLMN includes receiving, by the first device from the source AMF, the slice set for the HPLMN (referring to the descriptions of step 902).

In a possible implementation, the first device receives, from the source AMF, information about the target PLMN, and the first device selects the second device based on the information about the target PLMN.

Therefore, the present disclosure discloses a communication method, including, when a terminal device is handed over from a source access network device in a source PLMN to a target access network device in a target PLMN, receiving, by a target NSSF in the target PLMN from a target NRF in the target PLMN, a slice set for an HPLMN of the terminal device (referring to the descriptions of step 904), and sending, by the target NSSF to the target NRF, a slice set that is for the target PLMN and that corresponds to the slice set for the HPLMN, where the slice set for the target PLMN is used to determine information about a target AMF in the target PLMN (referring to the descriptions of step 906).

In a possible implementation, the target NSSF determines the slice set for the target PLMN based on a mapping between a slice set for the HPLMN and a slice set for the target PLMN.

Therefore, the present disclosure discloses a communication method, including, when a terminal device is handed over from a source access network device in a source PLMN to a target access network device in a target PLMN, receiving, by a target NRF in the target PLMN from a target NSSF in the target PLMN, a slice set that is for the target PLMN and that corresponds to a slice set for an HPLMN of the terminal device (referring to the descriptions of step 906), determining, by the target NRF, information about a target AMF that supports the slice set for the target PLMN (referring to the descriptions of step 907), and sending, by the target NRF, the information about the target AMF to a source NRF (referring to the descriptions of step 909).

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE.

Figure 10:
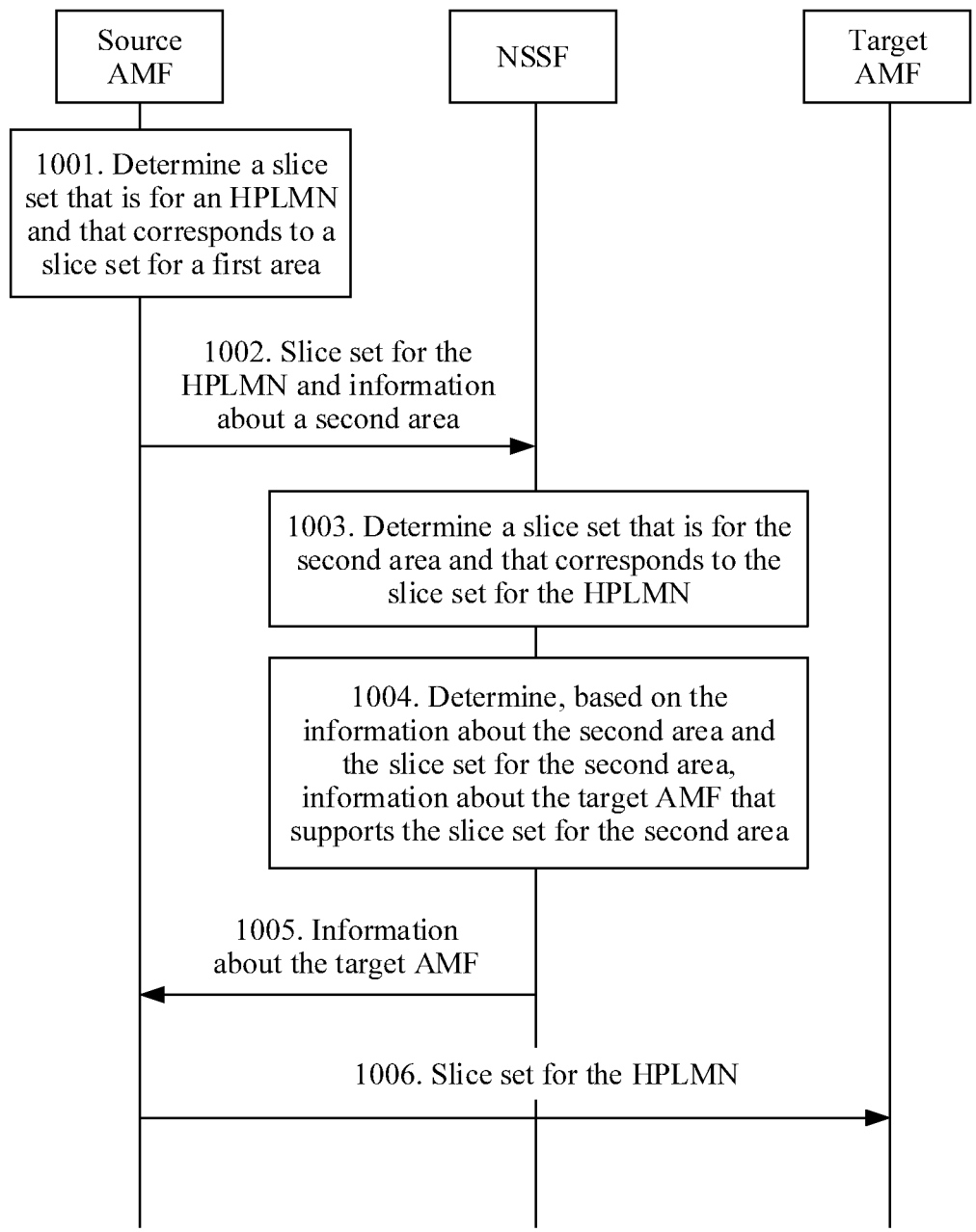
FIG. 10 is a schematic diagram of a communication method according to this application.

FIG. 10 is a schematic diagram of a sixth communication method according to this application. The method may be used for the scenario shown in FIG. 4 to select an appropriate target AMF for the UE. The method includes the following steps.

Step 1001: When the UE is handed over from the source RAN to the target RAN, the source AMF determines, based on a slice set for the first area, a slice set that is for an HPLMN and that corresponds to the slice set for the first area.

For example, if the source AMF stores a mapping (as shown in Table 3) between a slice set for the first area and a slice set for the HPLMN, the source AMF may determine, based on the mapping, the slice set that is for the HPLMN and that corresponds to the slice set for the first area. For example, it is determined, based on Table 3, that the slice set that is for the HPLMN and that corresponds to the slice set (including the S-NSSAI-A1 and the S-NSSAI-B1) in the first area includes the S-NSSAI-AA1 and the S-NSSAI-BB1.

Optionally, the mapping may be stored in a context of the UE.

In an implementation, before step 1001, the source AMF receives a handover required (handover required) message sent by the source RAN, where the message may carry a target identifier (target ID), the target identifier includes an identifier of the target RAN and a target TAI of the target RAN, and the target TAI further includes information about a target PLMN (such as an ID of the target PLMN).

The target PLMN in which the target RAN is located and a source PLMN in which the source RAN is located are a same PLMN.

Step 1002: The source AMF sends the slice set for the HPLMN and information about the second area to an NSSF. Correspondingly, the NSSF may receive the slice set for the HPLMN and the information about the second area.

For example, the source AMF initiates a request message to the NSSF by invoking an Nnssf_NSSelection_Get service operation of the NSSF, and the request message carries the slice set for the HPLMN and the information about the second area. The information about the second area includes the target TAI of the target RAN.

Step 1003: The NSSF determines a slice set for the second area based on a mapping between a slice set for the HPLMN and a slice set for the second area.

After receiving the slice set for the HPLMN and the information about the second area, the NSSF determines to select the slice set for the second area. Further, the NSSF may determine the slice set for the second area based on the mapping between a slice set for the HPLMN and a slice set for the second area.

The NSSF may store the mapping (as shown in Table 4) between a slice set for the second area and a slice set for the HPLMN such that the NSSF may determine, based on the mapping, the slice set that is for the second area and that corresponds to the slice set for the HPLMN. For example, if the slice set that is for the HPLMN and that is received by the NSSF includes the S-NSSAI-AA1 and the S-NSSAI-BB1, it may be determined, based on Table 4, that the slice set for the second area includes the S-NSSAI-C1 and the S-NSSAI-D1.

Step 1004: The NSSF determines, based on the information about the second area and the slice set for the second area, information about a target AMF that supports the slice set for the second area.

Step 1005: The NSSF sends the information about the target AMF to the source AMF. Correspondingly, the source AMF may receive the information about the target AMF.

The information about the target AMF may be a target AMF set that support the slice set for the second area, and the target AMF set includes the target AMF that serves the UE and that is in the second area.

The NSSF determines the slice set for the second area based on the slice set for the HPLMN, and then determines the information about the target AMF based on the slice set for the second area. Therefore, it may be understood that the slice set for the HPLMN may be used to determine the target AMF.

For example, the NSSF sends an Nnssf_NSSelection_Get response to the source AMF, and the Nnssf_NSSelection_Get response carries the information about the target AMF.

After receiving the information about the target AMF, the source AMF selects an AMF, that is, the target AMF, from the AMF set indicated by the information about the target AMF.

Step 1006: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of PDU sessions associated with the slice set for the HPLMN. Optionally, other context information of the UE may further be sent, for example, information about an SMF on a source side.

Optionally, after receiving the slice set for the HPLMN, the target AMF may obtain the slice set for the second area based on the slice set for the HPLMN. For example, the target AMF may obtain the slice set for the second area based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 4) between a slice set for the second area and a slice set for the HPLMN. Alternatively, the configuration information includes a roaming agreement between the second area and the HPLMN. The target AMF may determine the mapping (as shown in Table 4) between a slice set for the second area and a slice set for the HPLMN according to the roaming agreement. In this case, the target AMF may determine, based on the slice set for the HPLMN and the mapping, the slice set that is for the second area and that corresponds to the slice set for the HPLMN.

For example, if the slice set that is for the HPLMN and that is received by the target AMF includes the S-NSSAI-AA1 and the S-NSSAI-BB1, it may be determined, based on Table 4, that the slice set for the second area includes the S-NSSAI-C1 and the S-NSSAI-D1.

Manner 2: The target AMF does not store the mapping between a slice set for the second area and a slice set for the HPLMN. That is, the target AMF does not store a roaming agreement between the second area and the HPLMN. In this case, the target AMF sends first information to the target NSSF in the target PLMN, where the first information includes the slice set for the HPLMN, and the target AMF receives, from the target NSSF, the slice set for the second area.

Optionally, the first information further includes first indication information. The first indication information is used to indicate the target NSSF to generate the slice set for the second area.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and an HPLMN ID to the target NSSF.

For example, the target NSSF may return the slice set for the second area to the target AMF by invoking an Nnssf_NSSelection_Get response service operation. Optionally, the target NSSF may alternatively return the mapping (as shown in Table 4) between a slice set for the second area and a slice set for the HPLMN to the target AMF by invoking an Nnssf_NSSelection_Get response service operation. Correspondingly, the target AMF receives, from the target NSSF, the mapping between a slice set for the HPLMN and a slice set for the second area.

For example, if the slice set that is for the HPLMN and that is sent by the target AMF to the target NSSF includes the S-NSSAI-AA1 and the S-NSSAI-BB1, the target NSSF maps the S-NSSAI-AA1 and the S-NSSAI-BB1 to the S-NSSAI-C1 and the S-NSSAI-D1 based on Table 4. In this case, the slice set for the second area is the S-NSSAI-C1 and the S-NSSAI-D1.

Based on the foregoing solution, after receiving the slice set for the HPLMN, the target AMF may determine the slice set for the second area based on the slice set for the HPLMN, to select an appropriate slice set for the second area for the UE, thereby implementing normal communication of the UE. Further, in this solution, a source side does not send allowed NSSAI (that is, the slice set for the first area) on the source side or the mapping between a slice set for the HPLMN and a slice set for the first area to a target side, but sends the slice set that is for the HPLMN and that corresponds to the slice set for the first area to the target side. This can avoid the following problems: (1) Because slices deployed in different areas of a same PLMN are different, there may be different mappings between slice sets in the different areas of the PLMN and a slice set for the HPLMN (where for example, the mapping-3 in Table 3 is different from the mapping-4 in Table 4), and consequently the second area (for example, the target AMF) may not recognize the slice set for the first area. (2) If the source AMF directly sends the mapping between a slice set for the HPLMN and a slice set for the first area to the AMF on the target side, a security risk of exposing slice deployment in the first area may exist.

Figure 11:
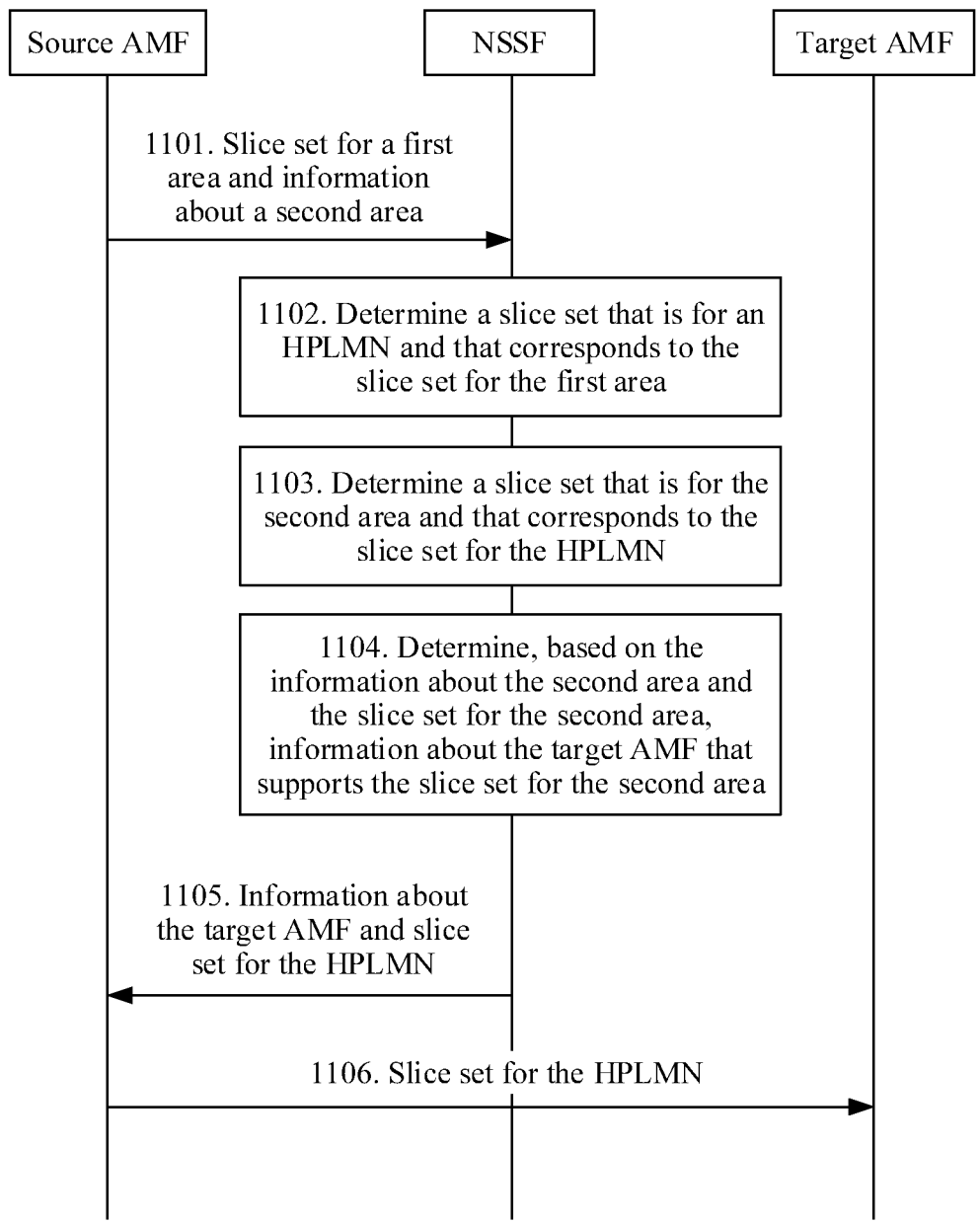
FIG. 11 is a schematic diagram of a communication method according to this application.

FIG. 11 is a schematic diagram of a seventh communication method according to this application. The method may be used for the scenario shown in FIG. 4 to select an appropriate target AMF for the UE. The method includes the following steps.

Step 1101: When the UE is handed over from the source RAN to the target RAN, the source AMF sends a slice set for the first area and information about the second area to an NSSF. Correspondingly, the NSSF may receive the slice set for the first area and the information about the second area.

In an implementation, before step 1101, the source AMF receives a handover required (handover required) message sent by the source RAN, where the message may carry a target identifier (target ID), the target identifier includes an identifier of the target RAN and a target TAI of the target RAN, and the target TAI further includes information about a target PLMN (such as an ID of the target PLMN).

The information about the second area includes the target TAI of the target RAN, and the target PLMN in which the target RAN is located and a source PLMN in which the source RAN is located are a same PLMN.

Step 1102: The NSSF determines a slice set that is for an HPLMN and that corresponds to the slice set for the first area.

For example, if the NSSF stores a mapping (as shown in Table 3) between a slice set for the first area and a slice set for the HPLMN, the NSSF may determine, based on the mapping, the slice set that is for the HPLMN and that corresponds to the slice set for the first area. For example, if the slice set that is for the first area and that is received by the NSSF includes the S-NSSAI-A1 and the S-NSSAI-B1, it may be determined, based on Table 3, that the slice set that is for the HPLMN and that corresponds to the slice set for the first area includes the S-NSSAI-AA1 and the S-NSSAI-BB1.

Optionally, the mapping may be stored in a context of the UE.

Step 1103 and step 1104 are the same as step 1003 and step 1004 in the embodiment in FIG. 10. Refer to the foregoing descriptions.

Step 1105: The NSSF sends the information about the target AMF and the slice set for the HPLMN to the source AMF. Correspondingly, the source AMF may receive the information about the target AMF and the slice set for the HPLMN.

For example, the NSSF sends an Nnssf_NSSelection_Get response to the source AMF, and the Nnssf_NSSelection_Get response carries the information about the target AMF and the slice set for the HPLMN.

In still another implementation, the NSSF may alternatively separately send the information about the target AMF and the slice set for the HPLMN to the source AMF using two steps. For example, the NSSF may send the slice set for the HPLMN to the source AMF in any step after step 1102 and before step 1106. The NSSF may send the information about the target AMF to the source AMF after step 1103 and before step 1106.

The information about the target AMF may be a target AMF set (AMF set) that support the slice set for the second area, and the target AMF set includes the target AMF that serves the UE and that is in the second area.

The NSSF determines the slice set for the second area based on the slice set for the HPLMN, and then determines the information about the target AMF based on the slice set for the second area. Therefore, it may be understood that the slice set for the HPLMN may be used to determine the target AMF.

After receiving the information about the target AMF, the source AMF selects an AMF, that is, the target AMF, from the AMF set indicated by the information about the target AMF.

Step 1106: The source AMF sends the slice set for the HPLMN to the target AMF. Correspondingly, the target AMF may receive the slice set for the HPLMN.

For example, the source AMF sends an Namf_Communication_CreateUEContext Request to the target AMF, and the Namf_Communication_CreateUEContext Request carries the slice set for the HPLMN.

Optionally, the source AMF may further send, to the target AMF, a list of PDU sessions associated with the slice set for the HPLMN. Optionally, other context information of the UE may further be sent, for example, information about an SMF on a source side.

Optionally, after receiving the slice set for the HPLMN, the target AMF may obtain the slice set for the second area based on the slice set for the HPLMN. For example, the target AMF may obtain the slice set for the second area based on the slice set for the HPLMN in either of the following two manners.

Manner 1: The target AMF determines the slice set for the target PLMN based on the slice set for the HPLMN and configuration information. For example, the target AMF may store the configuration information. The configuration information includes the mapping (as shown in Table 4) between a slice set for the second area and a slice set for the HPLMN. Alternatively, the configuration information includes a roaming agreement between the second area and the HPLMN. The target AMF may determine the mapping (as shown in Table 4) between a slice set for the second area and a slice set for the HPLMN according to the roaming agreement. In this case, the target AMF may determine, based on the slice set for the HPLMN and the mapping, the slice set that is for the second area and that corresponds to the slice set for the HPLMN.

For example, if the slice set that is for the HPLMN and that is received by the target AMF includes the S-NSSAI-AA1 and the S-NSSAI-BB1, it may be determined, based on Table 4, that the slice set for the second area includes the S-NSSAI-C1 and the S-NSSAI-D1.

Manner 2: The target AMF does not store the mapping between a slice set for the second area and a slice set for the HPLMN. That is, the target AMF does not store a roaming agreement between the second area and the HPLMN. In this case, the target AMF sends first information to the target NSSF in the target PLMN, where the first information includes the slice set for the HPLMN, and the target AMF receives, from the target NSSF, the slice set for the second area.

Optionally, the first information further includes first indication information. The first indication information is used to indicate the target NSSF to generate the slice set for the second area.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and an HPLMN ID to the target NSSF.

For example, the target NSSF may return the slice set for the second area to the target AMF by invoking an Nnssf_NSSelection_Get response service operation. Optionally, the target NSSF may alternatively return the mapping (as shown in Table 4) between a slice set for the second area and a slice set for the HPLMN to the target AMF by invoking an Nnssf_NSSelection_Get response service operation. Correspondingly, the target AMF receives, from the target NSSF, the mapping between a slice set for the HPLMN and a slice set for the second area.

For example, if the slice set that is for the HPLMN and that is sent by the target AMF to the target NSSF includes the S-NSSAI-AA1 and the S-NSSAI-BB1, the target NSSF maps the S-NSSAI-AA1 and the S-NSSAI-BB1 to the S-NSSAI-C1 and the S-NSSAI-D1 based on Table 4. In this case, the slice set for the second area is the S-NSSAI-C1 and the S-NSSAI-D1.

Based on the foregoing solution, after receiving the slice set for the HPLMN, the target AMF may determine the slice set for the second area based on the slice set for the HPLMN, to select an appropriate slice set for the second area for the UE, thereby implementing normal communication of the UE. Further, in this solution, the source side does not send allowed NSSAI (that is, the slice set for the first area) on the source side or the mapping between a slice set for the HPLMN and a slice set for the first area to a target side, but sends the slice set that is for the HPLMN and that corresponds to the slice set for the first area to the target side. This can avoid the following problems: (1) Because slices deployed in different areas of a same PLMN are different, there may be different mappings between slice sets in the different areas of the PLMN and a slice set for the HPLMN (for example, the mapping-3 in Table 3 is different from the mapping-4 in Table 4), and consequently the second area (for example, the target AMF) may not recognize the slice set for the first area. (2) If the source AMF directly sends the mapping between a slice set for the HPLMN and a slice set for the first area to the AMF on the target side, a security risk of exposing slice deployment in the first area may exist.

Therefore, the present disclosure discloses a communication method, including when a terminal device is handed over from a source access network device in a first area to a target access network device in a second area, obtaining, by a source AMF in the first area based on a slice set for the first area, information about a target AMF in the second area (referring to the descriptions of step 1005 and step 1105), and sending, by the source AMF, a slice set for an HPLMN of the terminal device to the target AMF, where the slice set for the HPLMN is corresponding to the slice set for the first area, and the slice set for the HPLMN is used to determine a slice set for the second area (referring to the descriptions of step 1006 and step 1106).

In a possible implementation, the first area and the second area are in a same PLMN.

In a possible implementation, the source AMF determines, based on a mapping between a slice set for the first area and a slice set for the HPLMN, the slice set that is for the HPLMN and that corresponds to the slice set for the first area.

In a possible implementation, obtaining, by a source AMF based on a slice set for the first area, information about a target AMF in the second area includes sending, by the source AMF, the slice set for the HPLMN and information about the second area to an NSSF (referring to the descriptions of step 1002), and receiving, by the source AMF from the NSSF, the information about the target AMF, where the information about the target AMF is determined based on the slice set for the HPLMN and the information about the second area.

In a possible implementation, the source AMF sends the slice set for the first area to the NSSF (referring to the descriptions of step 1101), and the source AMF receives, from the NSSF, the slice set that is for the HPLMN and that corresponds to the slice set for the first area.

In a possible implementation, obtaining, by a source AMF based on a slice set for the first area, information about a target AMF in the second area includes sending, by the source AMF, the information about the second area to the NSSF (referring to the descriptions of step 1002 and step 1101), and receiving, by the source AMF from the NSSF, the information about the target AMF, where the information about the target AMF is determined based on the slice set for the first area and the information about the second area (referring to the descriptions of step 1005 and step 1105).

Therefore, the present disclosure discloses a communication method, including, when a terminal device is handed over from a source access network device in a first area to a target access network device in a second area, obtaining, by an NSSF, a slice set that is for an HPLMN of the terminal device and that corresponds to a slice set for the first area and information about the second area (referring to the descriptions of step 1002, step 1101, and step 1102), determining, by the NSSF, a slice set for the second area based on the slice set for the HPLMN and the information about the second area (referring to the descriptions of step 1003 and step 1103), determining, by the NSSF, information about a target AMF based on the slice set for the second area (referring to the descriptions of step 1004 and step 1104), and sending, by the NSSF, the information about the target AMF to the source AMF (referring to the descriptions of step 1005 and step 1105).

In a possible implementation, obtaining, by an NSSF, a slice set that is for an HPLMN of the terminal device and that corresponds to a slice set for the first area includes receiving, by the NSSF from a source AMF in the first area, the slice set for the first area, and determining the slice set that is for the HPLMN and that corresponds to the slice set for the first area, or receiving, by the NSSF from the source AMF, the slice set for the HPLMN.

In a possible implementation, the NSSF stores a mapping between a slice set for the first area and a slice set for the HPLMN, and a mapping between a slice set for the second area and a slice set for the HPLMN.

Based on the foregoing solution, after receiving the slice set for the HPLMN, the target AMF may determine the slice set for a target PLMN based on the slice set for the HPLMN, to select an appropriate slice set for the target PLMN for the UE, thereby implementing normal communication of the UE.

The solutions provided in this application are described above mainly from a perspective of interaction between the network elements. It may be understood that, to implement the foregoing functions, each of the network elements includes a corresponding hardware structure and/or a software module for performing the foregoing functions. A person skilled in the art should easily be aware that, in combination with the examples of units and algorithm steps that are described in the embodiments disclosed in this specification, the present disclosure may be implemented using hardware or a combination of hardware and computer software. Whether a function is performed using hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 12:
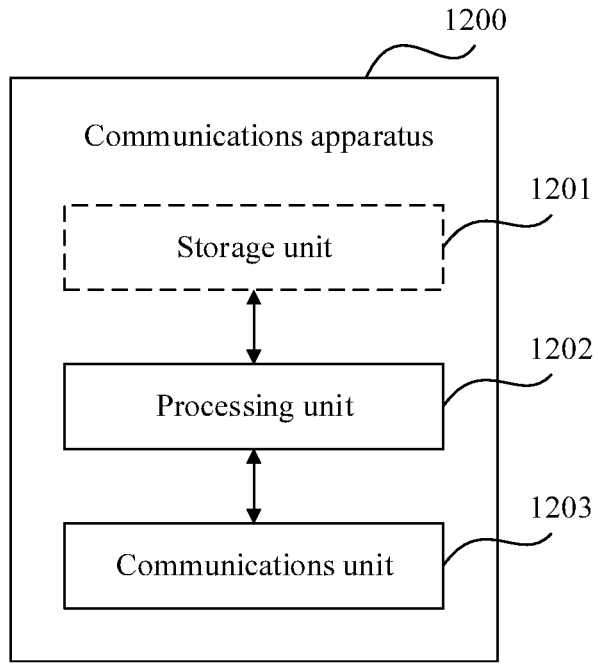
FIG. 12 is a schematic diagram of a communications apparatus according to this application.

FIG. 12 is a possible example block diagram of a communications apparatus 1200 according to this application. The communications apparatus 1200 may exist in a form of software or hardware. The communications apparatus 1200 may include a processing unit 1202 and a communications unit 1203. In an implementation, the communications unit 1203 may include a receiving unit and a sending unit. The processing unit 1202 is configured to control and manage an action of the communications apparatus 1200. The communications unit 1203 is configured to support the communications apparatus 1200 in communicating with another network entity. The communications apparatus 1200 may further include a storage unit 1201 configured to store program code and data of the communications apparatus 1200.

The processing unit 1202 may be a processor or a controller, such as a general-purpose central processing unit (CPU), a general-purpose processor, a digital signal processor (DSP), an application-specific integrated circuit (ASIC), a field-programmable gate array (FPGA) or another programmable logical device, a transistor logical device, a hardware component, or any combination thereof. The processing unit may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The storage unit 1201 may be a memory. The communications unit 1203 is an interface circuit of the apparatus, and is configured to receive a signal from another apparatus. For example, when the apparatus is implemented using a chip, the communications unit 1203 is an interface circuit that is of the chip and that is configured to receive a signal from another chip or apparatus, or is an interface circuit that is of the chip and that is configured to send a signal to another chip or apparatus.

The communications apparatus 1200 may be the mobility management network element (for example, the source mobility management network element or the target mobility management network element) in any one of the foregoing embodiments, or may be a chip used for the mobility management network element. For example, when the communications apparatus 1200 is the mobility management network element, the processing unit 1202 may be, for example, a processor, and the communications unit 1203 may be, for example, a transceiver. Optionally, the transceiver may include a radio frequency circuit, and the storage unit may be, for example, a memory. For example, when the communications apparatus 1200 is the chip used for the mobility management network element, the processing unit 1202 may be, for example, a processor, and the communications unit 1203 may be, for example, an input/output interface, a pin, or a circuit. The processing unit 1202 may execute a computer-executable instruction stored in the storage unit. Optionally, the storage unit is a storage unit, such as a register or a cache, in the chip. Alternatively, the storage unit may be a storage unit that is in the mobility management network element and that is located outside the chip, for example, a read-only memory (ROM) or another type of static storage device that can store static information and an instruction, or a random-access memory (RAM).

In an embodiment, the communications apparatus 1200 is the source mobility management network element. When a terminal device is handed over from a source access network device in a first area to a target access network device in a second area, the processing unit 1202 is configured to obtain information about a target mobility management network element in the second area based on a slice set for the first area, and the communications unit 1203 is configured to send a slice set for an HPLMN of the terminal device to the target mobility management network element, where the slice set for the HPLMN is corresponding to the slice set for the first area, and the slice set for the HPLMN is used to determine a slice set for the second area.

In a possible implementation, the first area is a source PLMN, and the second area is a target PLMN.

In a possible implementation, the processing unit 1202 is configured to determine, based on a mapping between a slice set for the source PLMN and a slice set for the HPLMN, the slice set that is for the HPLMN and that corresponds to the slice set for the source PLMN.

In a possible implementation, the communications unit 1203 is configured to send the slice set for the HPLMN and information about the target PLMN to a first device, and receive, from the first device, information about the target mobility management network element, where the first device is a source slice selection network element or a source network repository network element in the source PLMN.

In a possible implementation, the communications unit 1203 is configured to send the slice set for the HPLMN to the source slice selection network element in the source PLMN, receive, from the source slice selection network element, the slice set for the target PLMN, send the slice set for the target PLMN and the information about the target PLMN to the source network repository network element in the source PLMN, and receive, from the source network repository network element, the information about the target mobility management network element.

In a possible implementation, the communications unit 1203 is further configured to send the slice set for the source PLMN to the source slice selection network element in the source PLMN, and receive, from the source slice selection network element, the slice set for the HPLMN.

In a possible implementation, the communications unit 1203 is configured to send the information about the target PLMN to the source slice selection network element in the source PLMN, and receive, from the source slice selection network element, the information about the target mobility management network element.

In a possible implementation, the communications unit 1203 is configured to receive, from the source slice selection network element in the source PLMN, the slice set for the target PLMN, send the slice set for the target PLMN and the information about the target PLMN to the source network repository network element in the source PLMN, and receive, from the source network repository network element, the information about the target mobility management network element.

In a possible implementation, the first area and the second area are in a same PLMN.

In a possible implementation, the processing unit 1202 is further configured to determine, based on a mapping between a slice set for the first area and a slice set for the HPLMN, the slice set that is for the HPLMN and that corresponds to the slice set for the first area.

In a possible implementation, the communications unit 1203 is configured to send the slice set for the HPLMN and information about the second area to a slice selection network element, and receive, from the slice selection network element, the information about the target mobility management network element, where the information about the target mobility management network element is determined based on the slice set for the HPLMN and the information about the second area.

In a possible implementation, the communications unit 1203 is configured to send the slice set for the first area to the slice selection network element, and receive, from the slice selection network element, the slice set that is for the HPLMN and that corresponds to the slice set for the first area.

In a possible implementation, the communications unit 1203 is configured to send the information about the second area to the slice selection network element, and receive, from the slice selection network element, the information about the target mobility management network element, where the information about the target mobility management network element is determined based on the slice set for the first area and the information about the second area.

It may be understood that, for a specific implementation process and corresponding beneficial effects when the communications apparatus is used for the foregoing communication method, refer to related descriptions in the foregoing method embodiment. Details are not described herein again.

Figure 13:
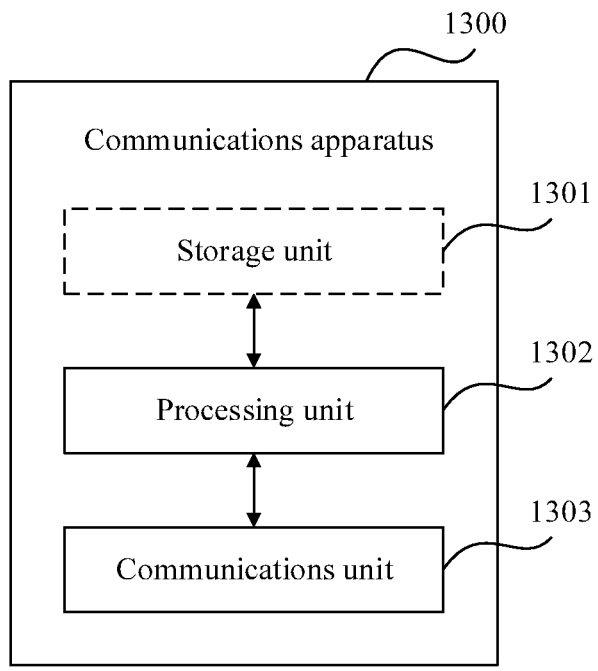
FIG. 13 is a schematic diagram of another communications apparatus according to this application.

FIG. 13 is a possible example block diagram of a communications apparatus 1300 according to this application. The communications apparatus 1300 may exist in a form of software or hardware. The communications apparatus 1300 may include a processing unit 1302 and a communications unit 1303. In an implementation, the communications unit 1303 may include a receiving unit and a sending unit. The processing unit 1302 is configured to control and manage an action of the communications apparatus 1300. The communications unit 1303 is configured to support the communications apparatus 1300 in communicating with another network entity. The communications apparatus 1300 may further include a storage unit 1301 configured to store program code and data of the communications apparatus 1300.

The processing unit 1302 may be a processor or a controller, such as a general-purpose CPU, a general-purpose processor, a DSP, an ASIC, an FPGA or another programmable logic device, a transistor logic device, a hardware component, or any combination thereof. The processing unit may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The storage unit 1301 may be a memory. The communications unit 1303 is an interface circuit of the apparatus, and is configured to receive a signal from another apparatus. For example, when the apparatus is implemented using a chip, the communications unit 1303 is an interface circuit that is of the chip and that is configured to receive a signal from another chip or apparatus, or is an interface circuit that is of the chip and that is configured to send a signal to another chip or apparatus.

The communications apparatus 1300 may be the slice selection network element (for example, the source slice selection network element or the target slice selection network element) in any one of the foregoing embodiments, or may be a chip used for the slice selection network element. For example, when the communications apparatus 1300 is the slice selection network element, the processing unit 1302 may be, for example, a processor, and the communications unit 1303 may be, for example, a transceiver. Optionally, the transceiver may include a radio frequency circuit, and the storage unit may be, for example, a memory. For example, when the communications apparatus 1300 is the chip used for the slice selection network element, the processing unit 1302 may be, for example, a processor, and the communications unit 1303 may be, for example, an input/output interface, a pin, or a circuit. The processing unit 1302 may execute a computer-executable instruction stored in the storage unit. Optionally, the storage unit is a storage unit, such as a register or a cache, in the chip. Alternatively, the storage unit may be a storage unit that is in the slice selection network element and that is located outside the chip, for example, a ROM or another type of static storage device that can store static information and an instruction, or a RAM.

In a first embodiment, the communications apparatus 1300 is the source slice selection network element. When a terminal device is handed over from a source access network device in a source PLMN to a target access network device in a target PLMN, the processing unit 1302 is configured to obtain a slice set that is for an HPLMN of the terminal device and that corresponds to a slice set for the source PLMN, and the communications unit is configured to send the slice set for the HPLMN to a target slice selection network element in the target PLMN, where the slice set for the HPLMN is used to determine a target mobility management network element in the target PLMN, receive, from the target slice selection network element, information about the target mobility management network element, and send the information about the target mobility management network element to a source mobility management network element in the source PLMN.

In a possible implementation, the communications unit 1303 is configured to receive, from the source mobility management network element, the slice set for the source PLMN, and determine the slice set that is for the HPLMN and that corresponds to the slice set for the source PLMN, or receive, from the source mobility management network element, the slice set for the HPLMN.

In a possible implementation, the communications unit 1303 is configured to receive, from the source mobility management network element, information about the target PLMN, and the processing unit 1302 is configured to select the target slice selection network element based on the information about the target PLMN.

In a second embodiment, the communications apparatus 1300 is the source slice selection network element. When a terminal device is handed over from a source access network device in a source PLMN to a target access network device in a target PLMN, the processing unit 1302 is configured to obtain a slice set that is for an HPLMN of the terminal device and that corresponds to a slice set for the source PLMN, and the communications unit 1303 is configured to send the slice set for the HPLMN to a target slice selection network element in the target PLMN, where the slice set for the HPLMN is used to determine a slice set for the target PLMN, receive, from the target slice selection network element, the slice set for the target PLMN, and send the slice set for the target PLMN to a source mobility management network element.

In a possible implementation, the communications unit 1303 is configured to receive, from the source mobility management network element, the slice set for the source PLMN, and the processing unit 1302 is configured to determine the slice set that is for the HPLMN and that corresponds to the slice set for the source PLMN, or the communications unit 1303 is configured to receive, from the source mobility management network element, the slice set for the HPLMN.

In a possible implementation, the communications unit 1303 is configured to receive, from the source mobility management network element, information about the target PLMN, and the processing unit 1302 is configured to select the target slice selection network element based on the information about the target PLMN.

In a third embodiment, the communications apparatus 1300 is the slice selection network element. When a terminal device is handed over from a source access network device in a first area to a target access network device in a second area, the processing unit 1302 is configured to obtain a slice set that is for an HPLMN of the terminal device and that corresponds to a slice set for the first area and information about the second area, determine a slice set for the second area based on the slice set for the HPLMN and the information about the second area, and determine information about a target mobility management network element based on the slice set for the second area, and the communications unit 1303 is configured to send the information about the target mobility management network element to a source mobility management network element.

In a possible implementation, the communications unit 1303 is configured to receive, from the source mobility management network element in the first area, the slice set for the first area, and the processing unit 1302 is configured to determine the slice set that is for the HPLMN and that corresponds to the slice set for the first area, or the communications unit 1303 is configured to receive, from the source mobility management network element, the slice set for the HPLMN.

In a possible implementation, the storage unit is configured to store a mapping between a slice set for the first area and a slice set for the HPLMN, and a mapping between a slice set for the second area and a slice set for the HPLMN.

In a fourth embodiment, the communications apparatus 1300 is the target slice selection network element. When a terminal device is handed over from a source access network device in a source PLMN to a target access network device in a target PLMN, the communications unit 1303 is configured to receive, from a source slice selection network element in the source PLMN, a slice set for an HPLMN of the terminal device, the processing unit 1302 is configured to determine information about a target mobility management network element that supports a slice set for the target PLMN, where the slice set for the target PLMN corresponds to the slice set for the HPLMN, and the communications unit 1303 is configured to send the information about the target mobility management network element to the source slice selection network element.

In a possible implementation, the processing unit 1302 is configured to determine the slice set for the target PLMN based on a mapping between a slice set for the HPLMN and a slice set for the target PLMN.

In a fifth embodiment, the communications apparatus 1300 is the target slice selection network element. When a terminal device is handed over from a source access network device in a source PLMN to a target access network device in a target PLMN, the communications unit 1303 is configured to receive, from a source slice selection network element in the source PLMN or from a target network repository network element in the target PLMN, a slice set for an HPLMN of the terminal device, and send, to the source slice selection network element or the target network repository network element, a slice set that is for the target PLMN and that corresponds to the slice set for the HPLMN, where the slice set for the target PLMN is used to determine information about a target mobility management network element in the target PLMN.

In a possible implementation, the processing unit 1302 is configured to determine the slice set for the target PLMN based on a mapping between a slice set for the HPLMN and a slice set for the target PLMN.

It may be understood that, for a specific implementation process and corresponding beneficial effects when the communications apparatus is used for the foregoing communication method, refer to related descriptions in the foregoing method embodiment. Details are not described herein again.

Figure 14:
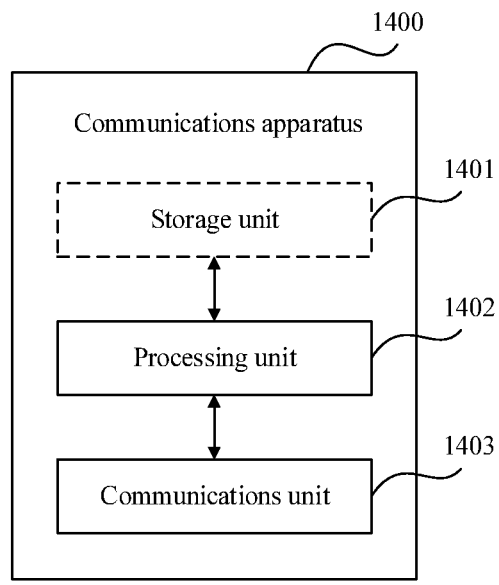
FIG. 14 is a schematic diagram of another communications apparatus according to this application.

FIG. 14 is a possible example block diagram of a communications apparatus 1400 according to this application. The communications apparatus 1400 may exist in a form of software or hardware. The communications apparatus 1400 may include a processing unit 1402 and a communications unit 1403. In an implementation, the communications unit 1403 may include a receiving unit and a sending unit. The processing unit 1402 is configured to control and manage an action of the communications apparatus 1400. The communications unit 1403 is configured to support the communications apparatus 1400 in communicating with another network entity. The communications apparatus 1400 may further include a storage unit 1401 configured to store program code and data of the communications apparatus 1400.

The processing unit 1402 may be a processor or a controller, such as a general-purpose CPU, a general-purpose processor, a DSP, an ASIC, an FPGA or another programmable logic device, a transistor logic device, a hardware component, or any combination thereof. The processing unit may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The storage unit 1401 may be a memory. The communications unit 1403 is an interface circuit of the apparatus, and is configured to receive a signal from another apparatus. For example, when the apparatus is implemented using a chip, the communications unit 1403 is an interface circuit that is of the chip and that is configured to receive a signal from another chip or apparatus, or is an interface circuit that is of the chip and that is configured to send a signal to another chip or apparatus.

The communications apparatus 1400 may be the network repository network element (for example, the source network repository network element or the target network repository network element) in any one of the foregoing embodiments, or may be a chip used for the network repository network element. For example, when the communications apparatus 1400 is the network repository network element, the processing unit 1402 may be, for example, a processor, and the communications unit 1403 may be, for example, a transceiver. Optionally, the transceiver may include a radio frequency circuit, and the storage unit may be, for example, a memory. For example, when the communications apparatus 1400 is the chip used for the network repository network element, the processing unit 1402 may be, for example, a processor, and the communications unit 1403 may be, for example, an input/output interface, a pin, or a circuit. The processing unit 1402 may execute a computer-executable instruction stored in the storage unit. Optionally, the storage unit is a storage unit, such as a register or a cache, in the chip. Alternatively, the storage unit may be a storage unit that is in the network repository network element and that is located outside the chip, for example, a ROM or another type of static storage device that can store static information and an instruction, or a RAM.

In a first embodiment, the communications apparatus 1400 is the source network repository network element. When a terminal device is handed over from a source access network device in a source PLMN to a target access network device in a target PLMN, the communications unit 1403 is configured to receive, from a source mobility management network element in the source PLMN, a slice set for the target PLMN, send the slice set for the target PLMN to a target network repository network element in the target PLMN, receive, from the target network repository network element, information about a target mobility management network element, and send the information about the target mobility management network element.

In a possible implementation, the communications unit 1403 is configured to receive, from the source mobility management network element, information about the target PLMN, and the processing unit 1402 is configured to determine the target network repository network element based on the information about the target PLMN.

In a second embodiment, the communications apparatus 1400 is the source network repository network element. When a terminal device is handed over from a source access network device in a source PLMN to a target access network device in a target PLMN, the processing unit 1402 is configured to obtain a slice set that is for an HPLMN of the terminal device and that corresponds to a slice set for the source PLMN, and the communications unit 1403 is configured to send the slice set for the HPLMN to a target network repository network element in the target PLMN, where the slice set for the HPLMN is used to determine a target mobility management network element in the target PLMN, receive, from the target network repository network element, information about the target mobility management network element, and send the information about the target mobility management network element to a source mobility management network element in the source PLMN.

In a possible implementation, the communications unit 1403 is configured to receive, from the source mobility management network element, the slice set for the source PLMN, and the processing unit 1402 is configured to determine the slice set that is for the HPLMN and that corresponds to the slice set for the source PLMN. Alternatively, the communications unit 1403 is configured to receive, from the source mobility management network element, the slice set for the HPLMN.

In a possible implementation, the communications unit 1403 is configured to receive, from the source mobility management network element, information about the target PLMN, and the processing unit 1402 is configured to select the target network repository network element based on the information about the target PLMN.

In a third embodiment, the communications apparatus 1400 is the target network repository network element. When a terminal device is handed over from a source access network device in a source PLMN to a target access network device in a target PLMN, the communications unit 1403 is configured to receive, from a target slice selection network element in the target PLMN or a source network repository network element in the source PLMN, a slice set that is for the target PLMN and that corresponds to a slice set for an HPLMN of the terminal device, the processing unit 1402 is configured to determine information about a target mobility management network element that supports the slice set for the target PLMN, and the communications unit 1403 is configured to send the information about the target mobility management network element to the source network repository network element.

It may be understood that, for a specific implementation process and corresponding beneficial effects when the communications apparatus is used for the foregoing communication method, refer to related descriptions in the foregoing method embodiment. Details are not described herein again.

Figure 15:
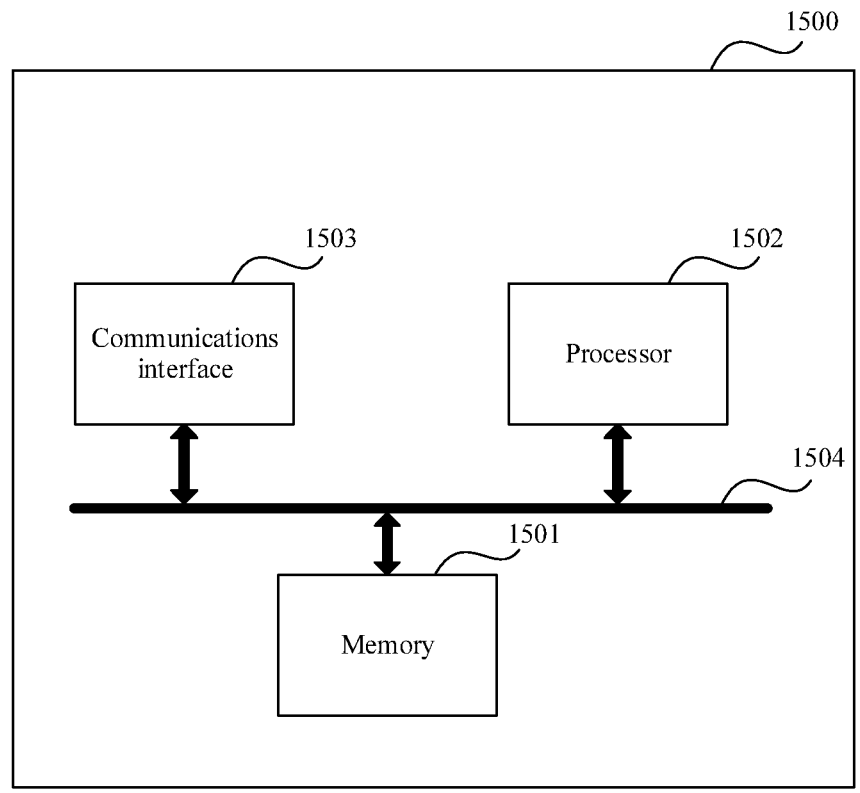
FIG. 15 is a schematic diagram of another communications apparatus according to this application.

FIG. 15 is a schematic diagram of a communications apparatus according to this application. The communications apparatus may be the foregoing mobility management network element (for example, the source mobility management network element or the target mobility management network element), the slice selection network element (for example, the source slice selection network element or the target slice selection network element), or the network repository network element (for example, the source network repository network element or the target network repository network element). The communications apparatus 1500 includes a processor 1502, a communications interface 1503, and a memory 1501. Optionally, the communications apparatus 1500 may further include a communications line 1504. The communications interface 1503, the processor 1502, and the memory 1501 may be connected to each other using the communications line 1504. The communications line 1504 may be a Peripheral Component Interconnect (PCI) bus, an Extended Industry Standard Architecture (EISA) bus, or the like. The communications line 1504 may be classified into an address bus, a data bus, a control bus, and the like. For ease of representation, only one thick line is used to represent the communications line in FIG. 15, but this does not mean that there is only one bus or only one type of bus.

The processor 1502 may be a CPU, a microprocessor, an ASIC, or one or more integrated circuits configured to control program execution in the solutions of this application.

The communications interface 1503 may be any apparatus such as a transceiver, and is configured to communicate with another device or a communications network, such as Ethernet, a RAN, a wireless local area network (WLAN), or a wired access network.

The memory 1501 may be a ROM, another type of static storage device that can store static information and an instruction, a RAM, or another type of dynamic storage device that can store information and an instruction, or may be an electrically erasable programmable ROM (EEPROM), a compact disc (CD) ROM (CD-ROM) or another CD storage, an optical disc storage (including a CD, a laser disc, an optical disc, a digital versatile disc (DVD), a BLU-RAY DISC, and the like), a magnetic disk storage medium or another magnetic storage device, or any other medium that can be configured to carry or store expected program code in a form of an instruction or a data structure and that can be accessed by a computer. However, the memory 1501 is not limited thereto. The memory may exist independently, and is connected to the processor using the communications line 1504. The memory may alternatively be integrated with the processor.

The memory 1501 is configured to store a computer-executable instruction for executing the solutions of this application, and the processor 1502 controls the execution. The processor 1502 is configured to execute the computer-executable instruction stored in the memory 1501, to implement the communication method provided in the foregoing embodiments of this application.

Optionally, the computer-executable instruction in this embodiment of this application may also be referred to as application program code. This is not limited in this embodiment of this application.

Figure 16:
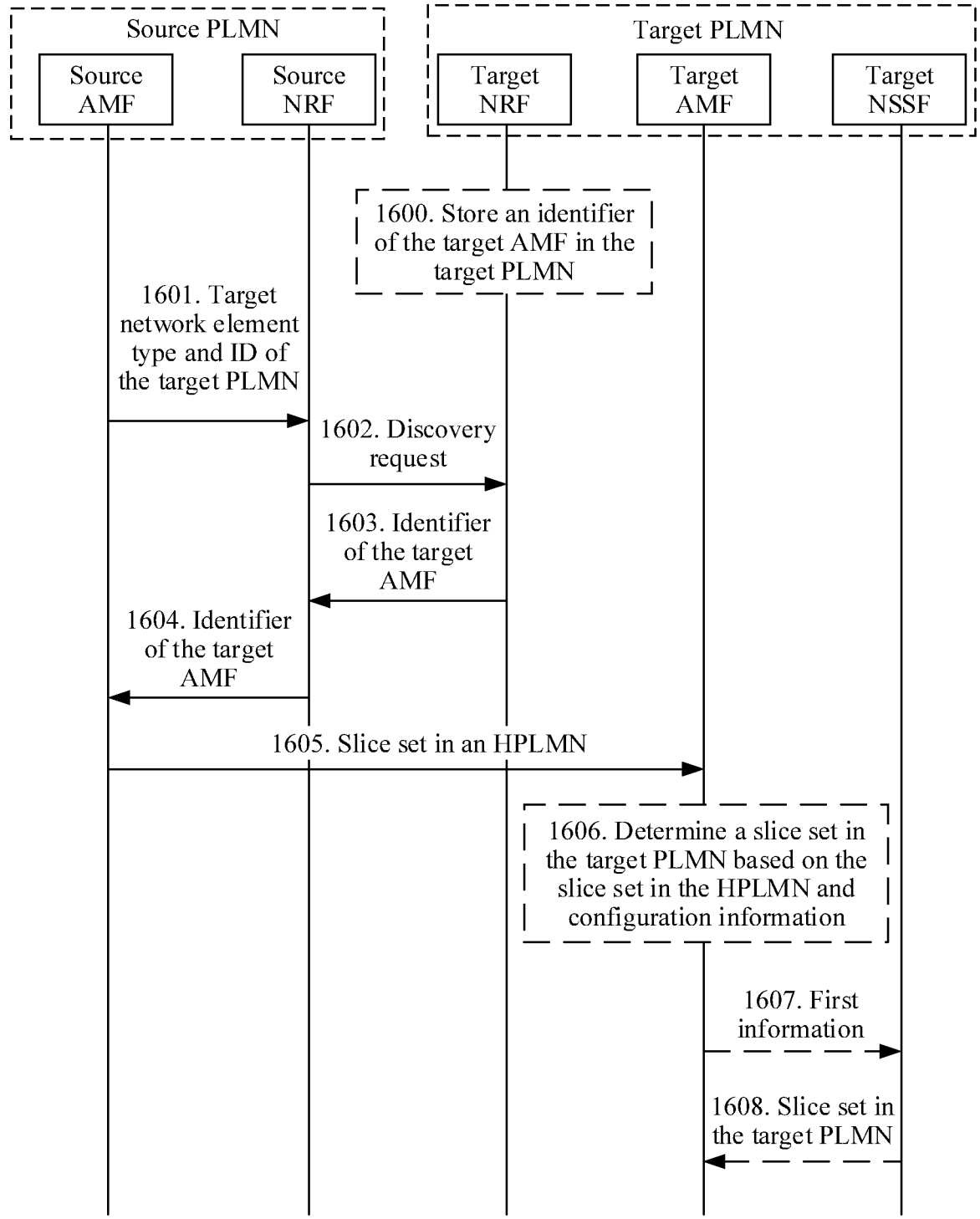
FIG. 16 is a schematic diagram of a communication method according to this application.

FIG. 16 is a schematic diagram of an eighth communication method according to this application. The method may be used for the scenario shown in FIG. 3 to select a target AMF for the UE. The method includes the following steps.

Step 1600: The target NRF stores an identifier of the target AMF in the target PLMN.

It should be noted that step 1600 is an optional step. The target NRF may alternatively obtain the identifier of the target AMF in another manner. For example, the target NRF obtains the identifier of the target AMF from another network element.

Step 1601: When the UE is handed over from the source RAN to the target RAN, the source AMF sends a target network element type and an ID of the target PLMN to the source NRF. Correspondingly, the source NRF may receive the target network element type and the ID of the target PLMN.

For example, a target TAI includes the ID of the target PLMN. The source AMF sends the ID of the target PLMN to the source NRF using the target TAI.

For example, the source AMF may initiate a request message to the source NRF by invoking an Nnrf_NFDiscovery_Request service operation of the source NRF, and the request message carries the target network element type and the ID of the target PLMN. The target network element type is an AMF, and is used to indicate that the requested network element type is an AMF network element.

Optionally, the source AMF may further send second indication information to the source NRF by invoking the foregoing service operation. The second indication information is used to indicate that the service operation of the source NRF occurs in an inter-system handover procedure.

In an implementation, before step 1601, the source AMF receives a handover required message sent by the source RAN, where the message may carry a target identifier (target ID), the target identifier includes an identifier of the target RAN and the target TAI of the target RAN, and the target TAI further includes information about the target PLMN (such as the ID of the target PLMN).

Optionally, the source AMF determines, based on the target identifier, that this handover is an inter-PLMN system handover, and therefore triggers execution of step 1601.

For example, if the source AMF determines that the target PLMN included in the target TAI is different from the PLMN in which the source AMF is located, the source AMF may determine that this handover is an inter-PLMN system handover.

Step 1602: The source NRF sends a discovery request to the target NRF. Correspondingly, the target NRF may receive the discovery request.

In an implementation, before step 1602, the source NRF determines an NRF network element (that is, the target NRF) in the target PLMN based on the ID of the target PLMN.

For example, the source NRF may send the discovery request to the target NRF by invoking an Nnrf_NFDiscovery_Request service operation of the target NRF. The discovery request includes the target network element type and the ID of the target PLMN that are received by the source NRF in step 1601.

Optionally, the source NRF may further send third indication information to the target NRF by invoking the foregoing service operation. The third indication information is used to indicate that the service operation of the target NRF occurs in an inter-system handover procedure.

Step 1603: The target NRF sends the identifier of the target AMF to the source NRF. Correspondingly, the source NRF may receive the identifier of the target AMF.

In an implementation, before step 1603, the target NRF determines the target AMF based on the ID of the target PLMN that is received in step 1602.

For example, the identifier of the target AMF is an ID of the target AMF or address information of the target AMF. For example, the identifier of the target AMF is stored in the target NRF in step 1600. The target AMF may be a default AMF in the target PLMN.

For example, the target NRF may send the identifier of the target AMF to the source NRF by invoking an Nnrf_NFDiscovery_Response service operation of the target NRF.

Optionally, if the source NRF sends the third indication information to the target NRF in step 1602, and the target NRF learns, based on the third indication information, that the invocation of the service operation of the target NRF in step 1602 occurs in the inter-system handover procedure, the target NRF sends the identifier of the target AMF to the source NRF.

Optionally, if the source NRF does not send the third indication information to the target NRF in step 1602, the target NRF sends the identifier of the target AMF to the source NRF based on the target network element type and the ID of the target PLMN that are carried in step 1602.

Step 1604: The source NRF sends the identifier of the target AMF to the source AMF. Correspondingly, the source AMF may receive the identifier of the target AMF.

For example, the source NRF may send the identifier of the target AMF to the source AMF by invoking an Nnrf_NFDiscovery_Response service operation of the source NRF.

Step 1605: The source AMF sends a slice set for an HPLMN to the target AMF. Correspondingly, the target AMF may receive the slice set for the HPLMN.

In an implementation, before step 1605, the source AMF determines the target AMF based on the identifier of the target AMF. The source AMF further determines, based on a mapping (as shown in Table 1) between a slice set for the source PLMN and a slice set for the HPLMN, the slice set that is for the HPLMN and that corresponds to the slice set for the source PLMN.

For example, the source AMF stores a context of the UE, and the context of the UE includes the slice set for the source PLMN. The context of the UE that is stored in the source AMF further stores the mapping (as shown in Table 1) between a slice set for the source PLMN and a slice set for the HPLMN such that the source AMF may determine, based on the mapping, the slice set that is for the HPLMN and that corresponds to the slice set for the source PLMN. For example, if the slice set for the source PLMN includes the S-NSSAI-A and the S-NSSAI-B, it is determined, based on Table 1, that the slice set that is for the HPLMN and that corresponds to the slice set for the source PLMN includes the S-NSSAI-AA and the S-NSSAI-BB.

Optionally, the source AMF may further send a list of PDU sessions to the target AMF by invoking the foregoing service operation.

Optionally, after step 1605, step 1606 is further included.

Step 1606: The target AMF determines a slice set for the target PLMN based on the slice set for the HPLMN and configuration information.

For example, the target AMF may store the configuration information. The configuration information includes a mapping (as shown in Table 2) between a slice set for the target PLMN and a slice set for the HPLMN. Alternatively, the configuration information includes a roaming agreement between the target PLMN and the HPLMN. The target AMF may determine the mapping (as shown in Table 2) between a slice set for the target PLMN and a slice set for the HPLMN according to the roaming agreement. In this case, the target AMF may determine, based on the slice set for the HPLMN and the mapping, the slice set that is for the target PLMN and that corresponds to the slice set for the HPLMN.

For example, if the slice set that is for the HPLMN and that is received by the target AMF includes the S-NSSAI-AA and the S-NSSAI-BB, it may be determined, based on Table 2, that the slice set for the target PLMN includes the S-NSSAI-C and the S-NSSAI-D.

Optionally, if the target AMF does not store a mapping between a slice set for the target PLMN and a slice set for the HPLMN, that is, the target AMF does not store a roaming agreement between the target PLMN and the HPLMN, step 1606 is not performed after step 1605, and step 1607 and step 1608 are further included after step 1605.

Step 1607: The target AMF sends first information to the target NSSF in the target PLMN, where the first information includes the slice set for the HPLMN.

Optionally, the first information further includes first indication information. The first indication information is used to indicate the target NSSF to generate the slice set for the target PLMN.

For example, an HPLMN ID is also referred to as a home PLMN ID of the UE.

For example, the target AMF may send the first information to the target NSSF by invoking an Nnssf_NSSelection_Get service operation of the target NSSF.

By invoking the foregoing service operation, the target AMF may send the slice set for the HPLMN, the TAI of the target RAN, and the HPLMN ID to the target NSSF.

Step 1608: The target NSSF sends the slice set for the target PLMN to the target AMF. Correspondingly, the target AMF receives, from the target NSSF in the target PLMN, the slice set for the target PLMN.

For example, the target NSSF may return the slice set for the target PLMN to the target AMF by invoking an Nnssf_NSSelection_Get response service operation. Optionally, the target NSSF may alternatively return the mapping (as shown in Table 2) between a slice set for the target PLMN and a slice set for the HPLMN to the target AMF by invoking an Nnssf_NSSelection_Get response service operation. Correspondingly, the target AMF receives the mapping between a slice set for the HPLMN and a slice set for the target PLMN from the target NSSF.

For example, if the slice set that is for the HPLMN and that is sent by the target AMF to the target NSSF includes the S-NSSAI-AA and the S-NSSAI-BB, the target NSSF maps the S-NSSAI-AA and the S-NSSAI-BB to the S-NS- SAI-C and the S-NSSAI-D based on Table 2. In this case, the slice set for the target PLMN is the S-NSSAI-C and the S-NSSAI-D.

Optionally, after the handover procedure is completed, the UE initiates a mobility registration update. A registration request message sent by the UE to the target AMF carries requested NSSAI. The target AMF performs AMF relocation based on the requested NSSAI.

Based on the foregoing solution, after receiving the slice set for the HPLMN, the target AMF may determine the slice set for the target PLMN based on the slice set for the HPLMN, to select an appropriate slice set for the target PLMN for the UE, thereby implementing normal communication of the UE. Further, in this solution, a source side does not send allowed NSSAI on the source side or the mapping between a slice set for the HPLMN and a slice set for the source PLMN to a target side, but sends the slice set that is for the HPLMN and that corresponds to the slice set for the source PLMN to the target side. This can avoid the following problems: (1) Because different roaming agreements exist between different VPLMNs and the HPLMN, different mappings (for example, the mapping-1 in Table 1 is different from the mapping-2 in Table 2) exist between valid S-NSSAI for the different VPLMNs and valid S-NSSAI for the HPLMN, and consequently the target side (for example, the target AMF) may not recognize the slice set for the source PLMN. (2) The mapping between a slice set for the HPLMN and a slice set for the source PLMN is determined according to the roaming agreement between the source PLMN and the HPLMN. If the source AMF directly sends the mapping to the target side, a security risk of exposing the roaming agreement between the source PLMN and the HPLMN may exist.

The communications apparatus 1200 shown in FIG. 12 may further be configured to perform the operation of the target AMF in FIG. 16. For example, the communications apparatus 1200 is the target mobility management network element.

When a terminal device is handed over from a source access network device in a first area (for example, a source PLMN) to a target access network device in a second area (for example, a target PLMN), the communications unit 1203 is configured to receive, from a source mobility management network element (for example, a source AMF network element) in the first area, a slice set for an HPLMN of the terminal device, where the slice set for the HPLMN is corresponding to a slice set for the first area, and the processing unit 1202 is configured to obtain a slice set for the second area based on the slice set for the HPLMN.

In a possible implementation, the processing unit 1202 determines the slice set for the second area based on configuration information.

In a possible implementation, the configuration information includes a mapping between a slice set for the second area and a slice set for the HPLMN, or the configuration information includes a roaming agreement between the second area and the HPLMN, and the roaming agreement is used to determine a mapping between a slice set for the second area and a slice set for the HPLMN.

In a possible implementation, the communications unit 1203 is configured to send first information to a target slice selection network element in the second area, and the first information includes the slice set for the HPLMN. In addition, the communications unit 1203 is configured to receive, from the target slice selection network element (for example, a target NSSF), the slice set for the second area.

In a possible implementation, the first information further includes indication information, and the indication information is used to indicate the target NSSF to generate the slice set for the target PLMN.

In a possible implementation, the communications unit 1203 is configured to receive the mapping between a slice set for the HPLMN and a slice set for the second area from the target NSSF.

In a possible implementation, the first area is the source PLMN, and the second area is the target PLMN.

It may be understood that, for a specific implementation process and corresponding beneficial effects when the communications apparatus is used for the foregoing communication method, refer to related descriptions in the foregoing method embodiment. Details are not described herein again.

The communications apparatus 1200 shown in FIG. 12 may further be configured to perform the operation of the source AMF in FIG. 16. For example, the communications apparatus 1200 is the source mobility management network element.

When a terminal device is handed over from a source access network device in a first area to a target access network device in a second area, the communications unit 1203 is configured to send a request message to a target network repository function network element (for example, a target NRF network element) in the second area, the communications unit 1203 is configured to receive, from the target network repository function network element, an identifier of a target mobility management network element in the second area, and the communications unit 1203 is configured to send a slice set for an HPLMN of the terminal device to the target mobility management network element (for example, a target AMF network element), where the slice set for the HPLMN is corresponding to a slice set for the first area, and the slice set for the HPLMN is used to determine a slice set for the second area.

In a possible implementation, the first area is a source PLMN, and the second area is a target PLMN.

It may be understood that, for a specific implementation process and corresponding beneficial effects when the communications apparatus is used for the foregoing communication method, refer to related descriptions in the foregoing method embodiment. Details are not described herein again.

The communications apparatus 1200 shown in FIG. 12 may further be configured to perform the operation of the target NRF in FIG. 16. For example, the communications apparatus 1200 is the target network repository function network element.

The processing unit 1202 configures an identifier of a target mobility management network element (for example, a target AMF network element) in the second area. When a terminal device is handed over from a source access network device in a first area to a target access network device in a second area, the communications unit 1203 is configured to receive a request message from a source mobility management network element (for example, a source AMF network element) in the first area, and the communications unit 1203 is configured to send the identifier of the target mobility management network element to the source mobility management network element.

In a possible implementation, the first area is a source PLMN, and the second area is a target PLMN.

It may be understood that, for a specific implementation process and corresponding beneficial effects when the communications apparatus is used for the foregoing communication method, refer to related descriptions in the foregoing method embodiment. Details are not described herein again.

Referring to a schematic diagram of a communications apparatus shown in FIG. 15, the communications apparatus may be the mobility management network element (for example, the source AMF or the target AMF) or the network repository network element (for example, the source NRF) shown in FIG. 16. For specific descriptions of the communications apparatus, refer to the descriptions in FIG. 15. Details are not described herein again.

A person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship for describing associated objects and represents that three relationships may exist. For example, A and/or B may represent the following three cases Only A exists, both A and B exist, and only B exists. The character "/" generally indicates an "or" relationship between the associated objects. "At least one" refers to one or more, and at least two refers to two or more. "At least one", "any one", or a similar expression thereof means any combination of these items, including any combination of a single item (quantity) or a plurality of items (quantity). For example, at least one (one piece) of a, b, or c may indicate a, b, c, a-b, a-c, b-c, or a-b-c, where a, b, and c may be singular or plural. "A plurality of" refers to two or more, and another quantifier is similar. In addition, for an element in the singular form "a", "an", and "the", unless otherwise clearly specified in the context, the element does not mean "one or only one", but means "one or more". For example, "a device" means one or more such devices.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

The various illustrative logical units and circuits described in the embodiments of the present disclosure may implement or operate the described functions using a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may alternatively be any traditional processor, controller, microcontroller, or state machine. The processor may alternatively be implemented using a combination of computing apparatuses, for example, a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by the processor, or a combination thereof. The software unit may be stored in a RAM, a flash memory, a ROM, an erasable programmable ROM (EPROM), an EEPROM, a register, a hard disk, a removable magnetic disk, a CD-ROM, or a storage medium of any other form in the art. For example, the storage medium may be connected to the processor such that the processor may read information from the storage medium and write information to the storage medium. Optionally, the storage medium may alternatively be integrated into the processor. The processor and the storage medium may be disposed in an ASIC.

These computer program instructions may alternatively be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the accompanying claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that these modifications and variations of this application fall within the scope of the claims of this application and their equivalent technologies.

What is claimed is:

1. A communication method comprising:
receiving, by a target network repository function network element in a second area from a source mobility management network element in a first area, a request message when handing over a terminal device from a source access network device in the first area to a target access network device in the second area;
sending, by the target network repository function network element in response to the request message, an address of a target mobility management network element in the second area to the source mobility management network element;
receiving, by the target mobility management network element from the source mobility management network element, a first slice set for a home public land mobile network (HPLMN) of the terminal device, wherein the first slice set corresponds to first allowed network slice selection assistance information of the terminal device in the first area; and obtaining, by the target mobility management network element, second allowed network slice selection assistance information of the terminal device in the second area based on the first slice set.

2. The method of claim 1, wherein obtaining the second allowed network slice selection assistance information of the terminal device in the second area comprises determining, by the target mobility management network element, the second allowed network slice selection assistance information of the terminal device in the second area based on the first slice set and configuration information.

3. The method of claim 2, wherein the configuration information comprises a mapping between the second allowed network slice selection assistance information of the terminal device in the second area and the first slice set.

4. The method of claim 2, wherein the configuration information comprises a roaming agreement between the second area and the HPLMN, and wherein the roaming agreement identifies a mapping between the second allowed network slice selection assistance information of the terminal device in the second area and the first slice set.

5. The method of claim 1, wherein obtaining the second allowed network slice selection assistance information of the terminal device in the second area comprises:

sending, by the target mobility management network element, first information comprising the first slice set to a target slice selection network element in the second area; and receiving, by the target mobility management network element from the target slice selection network element, the second allowed network slice selection assistance information of the terminal device in the second area.

6. The method of claim 5, further comprising receiving, by the target mobility management network element from the target slice selection network element, a mapping between the first slice set and the second allowed network slice selection assistance information of the terminal device in the second area.

7. The method of claim 1, wherein the first area is a source public land mobile network (PLMN), and wherein the second area is a target PLMN.

8. The method of claim 1, further comprising initiating, by the source mobility management network element, the request message to the target network repository function network element by invoking a network repository function (NRF) service operation.

9. A communication system comprising:

a target mobility management network element in a second area, wherein the target mobility management network element is coupled to a source mobility management network element in a first area, and wherein the target mobility management network element is configured to:

receive a first slice set for a home land mobile network (HPLMN) of a terminal device from the source mobility management network element, wherein the first slice set corresponds to first allowed network slice selection assistance information of the terminal device in the first area; and obtain second allowed network slice selection assistance information of the terminal device in the second area based on the first slice set; and a target network repository function network element in the second area, wherein the target network repository function network element is configured to:

receive, from the source mobility management network element, a request message when handing over the terminal device from a source access network device in the first area to a target access network device in the second area; and send, in response to the request message, an address of the target mobility management network element to the source mobility management network element.

10. The communication system of claim 9, wherein the target mobility management network element is further configured to determine the second allowed network slice selection assistance information of the terminal device in the second area based on the first slice set and configuration information.

11. The communication system of claim 10, wherein the configuration information comprises a mapping between the second allowed network slice selection assistance information of the terminal device in the second area and the first slice set.

12. The communication system of claim 10, wherein the configuration information comprises a roaming agreement between the second area and the HPLMN, and wherein the roaming agreement identifies a mapping between the second allowed network slice selection assistance information of the terminal device in the second area and the first slice set.

13. The communication system of claim 9, wherein the target mobility management network element is further configured to:

send first information comprising the first slice set to a target slice selection network element in the second area; and receive the second allowed network slice selection assistance information of the terminal device in the second area from the target slice selection network element.

14. The communication system of claim 13, wherein the target mobility management network element is further configured to receive a mapping between the first slice set and the second allowed network slice selection assistance information of the terminal device in the second area from the target slice selection network element.

15. The communication system of claim 9, wherein the first area is a source public land mobile network (PLMN).

16. The communication system of claim 15, wherein the second area is a target PLMN.

17. The communication system of claim 9, further comprising the source mobility management network element.

18. The communication system of claim 7, wherein the source mobility management network element is configured to initiate the request message to the target network repository function network element by invoking a network repository function (NRF) service operation.

19. The communication system of claim 12, wherein the handover of the terminal device from the source access network device to the target access network device is completed over an N2 interface.

20. The communication system of claim 9, wherein the source mobility management network element is further configured to receive the address from the target network repository function network element.

* * * * *

UNITED STATES PATENT AND TRADEMARK OFFICE
CERTIFICATE OF CORRECTION

PATENT NO. : 11,690,002 B2
APPLICATION NO. : 17/165374
DATED : June 27, 2023
INVENTOR(S) : Fangyuan Zhu, Yan Li and Hui Ni Page 1 of 1

It is certified that error appears in the above-identified patent and that said Letters Patent is hereby corrected as shown below:

In the Claims

Claim 18, Column 58, Line 52: "claim 7" should read "claim 9"

Claim 19, Column 58, Line 57: "claim 12" should read "claim 9"

Signed and Sealed this
Eighth Day of August, 2023

Katherine Kelly Vidal
*Director of the United States Patent and Trademark Office*